United States Patent
Qin

(10) Patent No.: US 12,315,030 B2
(45) Date of Patent: May 27, 2025

(54) RENDERING METHOD AND APPARATUS

(71) Applicant: Honor Device Co., Ltd., Shenzhen (CN)

(72) Inventor: Yuan Qin, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/246,228

(22) PCT Filed: Aug. 25, 2022

(86) PCT No.: PCT/CN2022/114771
§ 371 (c)(1),
(2) Date: Mar. 22, 2023

(87) PCT Pub. No.: WO2023/087827
PCT Pub. Date: May 25, 2023

(65) Prior Publication Data
US 2024/0311948 A1    Sep. 19, 2024

(30) Foreign Application Priority Data

Nov. 17, 2021  (CN) .......................... 202111364418.7
Dec. 17, 2021  (CN) .......................... 202111554611.7

(51) Int. Cl.
G06T 1/20        (2006.01)
(52) U.S. Cl.
CPC ...................................... G06T 1/20 (2013.01)
(58) Field of Classification Search
None
See application file for complete search history.

(56) References Cited

U.S. PATENT DOCUMENTS 12,008,675 B2 * 6/2024 Dagani ................. G06T 1/60
2013/0176322 A1   7/2013 Bakalash et al.
(Continued)

FOREIGN PATENT DOCUMENTS

CN     111681167 A     9/2020
CN     112199149 A     1/2021
(Continued)

OTHER PUBLICATIONS

Mathias Garbe et al., "Introduction to the Android Graphics Pipeline"; Wissenschaftliche Arbeit zur Erlangung des Grades Bachelor of Science; Mar. 1, 2014; Retrieved from the internet, URL:https://www.readkong.com/page/introduction-to-the-android-graphics-pipeline-7038253; 88 total pages.

*Primary Examiner* — Yanna Wu
(74) *Attorney, Agent, or Firm* — Rimon PC

(57) ABSTRACT

This application provides a rendering method and an apparatus. A first processor receives a rendering command delivered by an application. The rendering command is used to instruct a second processor to render a first image based on a first resolution. The first processor sends a rendering instruction to a second processor. The rendering instruction is used to instruct the second processor to render the first image. The second processor generates image data of the first image with a second resolution based on the rendering instruction. The second resolution is not greater than the first resolution. The second processor writes the image data of the first image with the second resolution into a first memory. The second processor reads image data of the first image with a third resolution from the first memory. The third resolution is greater than the second resolution.

19 Claims, 20 Drawing Sheets

(56) References Cited

U.S. PATENT DOCUMENTS

2020/0226964 A1* 7/2020 Marchya ................. G09G 5/391
2022/0197651 A1* 6/2022 Kumar ................... H04N 19/85

FOREIGN PATENT DOCUMENTS

| CN | 113222178 A | 8/2021 |
| CN | 113284054 A | 8/2021 |
| CN | 114998087 A | 9/2022 |
| GB | 2574721 A | 12/2019 |

* cited by examiner

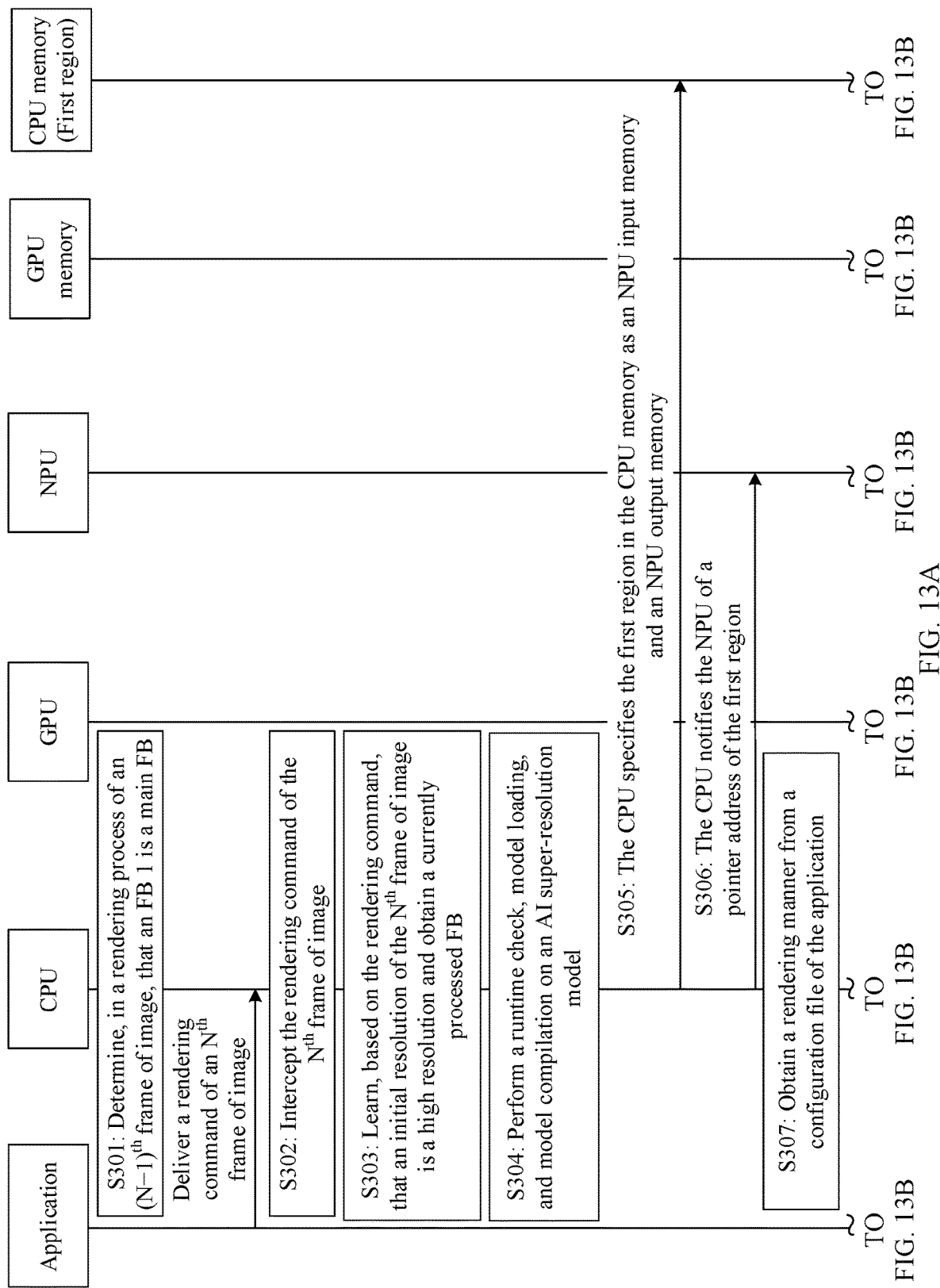

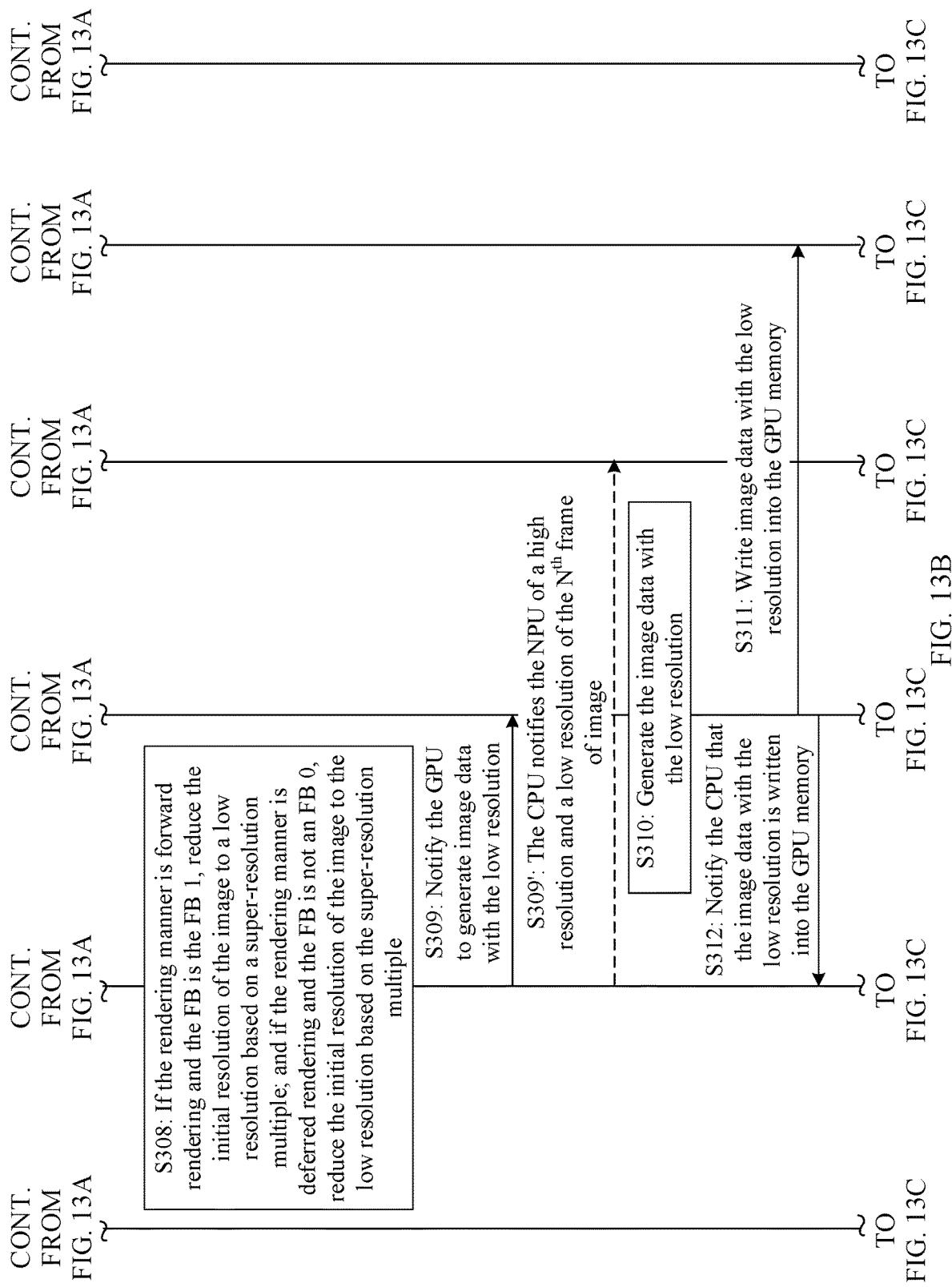

CONT. FROM FIG. 15B

S514': Determine a super-resolution of the AI super-resolution model

S514: Perform super-resolution rendering on the image data with the low resolution based on the super-resolution by using the AI super-resolution model, to obtain image data with the high resolution S515: Write the image with the high resolution based on the pointer address data

CONT. FROM FIG. 15B

S517: Read the image data with the high resolution based on the pointer address

CONT. FROM FIG. 15B

S518: Perform rendering processing on the currently processed FB based on the image data with the high resolution, to obtain a rendering result S519: After obtaining rendering results of all FBs, display the $N^{th}$ frame of image on a display based on the rendering results

CONT. FROM FIG. 15B

S516: Notify the GPU to read the image data with the high resolution from the shared memory

CONT. FROM FIG. 15B

FIG. 15C

RENDERING METHOD AND APPARATUS

CROSS-REFERENCE TO RELATED APPLICATIONS

This application is a national stage of International Application No. PCT/CN2022/114771, filed on Aug. 25, 2022, which claims priority to Chinese Patent Application No. 202111364418.7, filed on Nov. 17, 2021, and Chinese Patent Application No. 202111554611.7, filed on Dec. 17, 2021. The disclosures of each of the aforementioned applications are hereby incorporated by reference in their entireties.

TECHNICAL FIELD

This application relates to the field of image processing technologies, and in particular, to a rendering method and an apparatus.

BACKGROUND

With development of a display technology, a resolution of an image develops to a higher resolution. For example, the resolution of the image develops from 720P to 1080P, and then develops from 1080P to 2 k. Herein, P represents a total quantity of rows of pixels, for example, 720P represents that there are 720 rows of pixels; and K represents a total quantity of columns of pixels, for example, 2 k represents that there are 2000 columns of pixels. When an electronic device renders a high-resolution image or an ultra high resolution image, too much computing power overheads may be occupied. Consequently, there are problems that power consumption of the electronic device is improved, considerable heat is generated, and there is even frame freezing during running.

SUMMARY

This application provides a rendering method and an apparatus, to resolve problems that power consumption is improved, a device generates considerable heat, and there is frame freezing during running when an electronic device renders an image.

To achieve the foregoing objective, the following technical solutions are used in this application:

According to a first aspect, this application provides a rendering method. The method is applied to an electronic device, the electronic device runs an application, the electronic device includes a first processor and a second processor, and the method includes: The first processor receives a rendering command delivered by the application. The rendering command is used to instruct the second processor to render a first image based on a first resolution. The first processor sends a rendering instruction to the second processor. The rendering instruction is used to instruct the second processor to render the first image. The second processor generates image data of the first image with a second resolution based on the rendering instruction. The second resolution is not greater than the first resolution. The second processor writes the image data of the first image with the second resolution into a first memory. The second processor reads image data of the first image with a third resolution from the first memory. The third resolution is greater than the second resolution. The second processor generates the first image based on the image data of the first image with the third resolution. After the second processor writes the generated image data of the first image with the second resolution into the first memory, the second processor may read the image data of the first image with the third resolution from the first memory, to omit a step in which the second processor generates the image data of the first image with the third resolution, reduce computing power of the second processor, and shorten a time period spent in a rendering process, thereby reducing power consumption, improving rendering smoothness, and solving problems that the device generates considerable heat and there is frame freezing during running. In addition, that the third resolution is greater than the second resolution indicates that the second processor may obtain image data with a higher resolution, and the second processor may draw the first image based on the image data with the higher resolution, to improve image quality of the first image.

Optionally, if a rendering manner of the application is forward rendering, the rendering instruction corresponds to a first framebuffer, and a quantity of drawing instructions executed on the first framebuffer is greater than a preset threshold; and if the rendering manner of the application is deferred rendering, the rendering instruction corresponds to a framebuffer other than a last framebuffer in all framebuffers delivered by the application. When different rendering manners are used for the application, the rendering instruction sent by the first processor to the second processor also corresponds to different framebuffers. It indicates that when different rendering manners are used for the application, the first processor also sends the rendering instruction at different occasions, to control sending of the rendering instruction based on the framebuffer in different rendering manners.

Optionally, the first framebuffer is a framebuffer on which a largest quantity of drawing instructions are executed in all the framebuffers.

Optionally, before the first processor sends a rendering instruction to the second processor, the method further includes: The first processor obtains the rendering manner of the application from a configuration file of the application.

Optionally, the rendering instruction is used to instruct the second processor to render the first image based on the second resolution, and the second resolution is less than the first resolution. The rendering instruction sent by the first processor to the second processor carries the second resolution of the first image, to specify a resolution of the image data generated by the second processor, prevent the second processor from generating image data with a resolution that does not match a resolution required by the application, and improve accuracy of the first image. In addition, the second resolution is less than the first resolution, and a smaller resolution leads to a smaller data amount. Therefore, the second resolution less than the first resolution is specified, to reduce a data amount to be processed by the second processor, reduce power consumption of the electronic device, and resolve a problem that the device generates considerable heat.

Optionally, the second resolution is less than the first resolution; and the third resolution is the same as the first resolution, or the third resolution is greater than the first resolution. The second resolution is less than the first resolution, or the third resolution is the same as the first resolution. In a processing process of the second processor, because the second resolution is less than the first resolution, when the second processor generates the image data of the first image with the second resolution, the data amount to be processed by the second processor is reduced. However, that the third resolution is the same as the first resolution indicates that the second processor may read image data corresponding to the first resolution, and draw the first image having the first resolution, to ensure that image quality of the drawn first image is the same as image quality required by the application. If the third resolution is greater than the first resolution, the second processor may read image data with a resolution greater than the first resolution, so that the image quality of the drawn first image is superior to the image quality required by the application, and the image quality of the first image is improved.

Optionally, the second resolution is equal to the first resolution. The second resolution is equal to the first resolution, but the third resolution is greater than the second resolution. Therefore, the third resolution is also greater than the first resolution. When the application requests to render the first image based on the first resolution, the second processor may render the first image based on the third resolution, so that the image quality of the drawn first image is superior to the image quality required by the application, and the image quality of the first image is improved.

Optionally, the electronic device further includes a third processor, and the image data of the first image with the third resolution is generated by the third processor. After the second processor generates the image data of the first image with the second resolution, the third processor generates the image data of the first image with the third resolution, to actively invoke computing power of the third processor, meet a computing power requirement of a high-resolution image and/or an ultra high resolution image, reduce power consumption of the electronic device, and reduce occurrence of considerable heat. In addition, the third processor may share a computing amount of the second processor, to shorten the time period spent in the rendering process, thereby improving rendering smoothness, and resolving a problem that there is frame freezing during running.

Optionally, after the second processor writes the image data of the first image with the second resolution into a first memory, the method further includes: The third processor reads the image data of the first image with the second resolution from the first memory; the third processor generates the image data of the first image with the third resolution based on the image data of the first image with the second resolution; and the third processor writes the image data of the first image with the third resolution into the first memory.

Optionally, before the second processor writes the image data of the first image with the second resolution into a first memory, the method further includes: The second processor writes the image data of the first image with the third resolution into the second memory. The second processor has the permission to access the second memory and the first memory, and the third processor has the permission to access the first memory. The second processor sends a first notification to the first processor. The first notification is used to indicate that the image data of the first image with the second resolution is successfully written into the second memory. The first processor sends a second notification to the second processor in response to a case in which the first notification is received. The second notification is used to indicate the second processor to write the image data of the first image with the second resolution into the first memory, and the second notification carries an address pointer of the first memory. The second processor reads the image data of the first image with the second resolution from the second memory in response to a case in which the second notification is received. The first processor may monitor an image data reading/writing operation of the second processor, so that after the second processor writes the image data of the first image with the second resolution into the second memory, the second processor is triggered, in a timely manner, to write the image data of the first image with the second resolution into the first memory, to improve efficiency. In addition, the second notification sent by the first processor carries the address pointer of the first memory, and the second processor may write the image data of the first image with the second resolution into the first memory based on the address pointer of the first memory, to improve writing accuracy.

Optionally, after the second processor writes the image data of the first image with the second resolution into a first memory, and before the third processor reads the image data of the first image with the second resolution from the first memory, the method further includes: The first processor sends a third notification to the third processor. The third notification is used to indicate the third processor to read the image data of the first image with the second resolution from the first memory. After the second processor writes the image data of the first image with the second resolution into the first memory, the first processor may notify, in a timely manner, the third processor to read the image data, and trigger the third processor to generate the image data of the first image with the third resolution, to improve efficiency.

Optionally, after the third processor writes the image data of the first image with the third resolution into the first memory, and before the second processor reads image data of the first image with a third resolution from the first memory, the method further includes: The first processor sends a fourth notification to the second processor. The fourth notification is used to indicate the second processor to read the image data of the first image with the third resolution from the first memory, and the fourth notification carries the address pointer of the first memory. The first processor may monitor an image data reading/writing operation of the third processor, and after the third processor writes the image data of the first image with the third resolution into the first memory, the second processor is triggered, in a timely manner, to read the image data of the first image with the third resolution, to improve efficiency. In addition, the fourth notification sent by the first processor carries the address pointer of the first memory, and the second processor may read the image data of the first image with the third resolution from a correct address based on the address pointer of the first memory, to improve accuracy of the read image data.

Optionally, after the second processor reads image data of the first image with a third resolution from the first memory, the method further includes: The second processor writes the image data of the first image with the third resolution into the second memory. The second processor has the permission to access the second memory and the first memory, and the third processor has the permission to access the first memory.

Optionally, the electronic device further includes a third processor, and the image data of the first image with the third resolution is generated by the third processor. Before the first processor sends a rendering instruction to the second processor, the method further includes: The first processor obtains the first memory from a third memory through allocation. The first processor has permission to access the third memory. The first processor sends the pointer address of the first memory to the third processor. The third processor writes the image data of the first image with the third resolution into the first memory based on the pointer address, and reads the image data of the first image with the second resolution from the first memory based on the pointer address.

Optionally, the electronic device further includes a third processor, and the image data of the first image with the third resolution is generated by the third processor. Before the first processor sends a rendering instruction to the second processor, the method further includes: The first processor obtains the first memory from a hardware buffer through allocation. The first processor sends a pointer address of the first memory to the third processor and the second processor. The first processor, the second processor, and the third processor have permission to access the first memory, and the third processor and the second processor perform image data reading/writing on the first memory based on the pointer address. In this embodiment, the first processor may obtain the first memory from the hardware buffer through allocation. Before writing the image data of the first image with the second resolution into the first memory, the second processor does not need to write the image data of the first image with the second resolution into another memory. The second processor and the third processor may share data based on the first memory, to implement a zero copy of the data shared between the second processor and the third processor, and improve processing efficiency.

Optionally, after the second processor writes the image data of the first image with the second resolution into a first memory, and before the second processor reads image data of the first image with a third resolution from the first memory, the method further includes: The third processor reads the image data of the first image with the second resolution from the first memory. The third processor generates the image data of the first image with the third resolution based on the image data of the first image with the second resolution. The third processor writes the image data of the first image with the third resolution into the first memory.

Optionally, after the second processor writes the image data of the first image with the second resolution into a first memory, and before the third processor reads the image data of the first image with the second resolution from the first memory, the method further includes: The first processor sends a fifth notification to the third processor. The fifth notification is used to indicate the third processor to read the image data of the first image with the second resolution from the first memory. The first processor may monitor an image data reading/writing operation of the second processor, and after the second processor writes the image data of the first image with the second resolution into the first memory, the third processor is triggered, in a timely manner, to read the image data of the first image with the second resolution, to improve efficiency.

Optionally, after the third processor writes the image data of the first image with the third resolution into the first memory, and before the second processor reads image data of the first image with a third resolution from the first memory, the method further includes: The first processor sends a sixth notification to the second processor. The sixth notification is used to indicate the second processor to read the image data of the first image with the third resolution from the first memory. The first processor may monitor an image data reading/writing operation of the third processor, and after the third processor writes the image data of the first image with the third resolution into the first memory, the second processor is triggered, in a timely manner, to read the image data of the first image with the third resolution, to improve efficiency.

Optionally, the electronic device further includes a third processor, and the image data of the first image with the third resolution is generated by the third processor. The third processor runs an artificial intelligence super-resolution model, and the third processor performs super-resolution rendering on the image data of the first image with the second resolution by using the artificial intelligence super-resolution model, to generate the image data of the first image with the third resolution.

Optionally, before the third processor performs super-resolution rendering on the image data of the first image with the second resolution by using the artificial intelligence super-resolution model, the method further includes: The first processor sends the first resolution and the second resolution to the third processor. The third processor determines a super-resolution multiple of the artificial intelligence super-resolution model based on the first resolution and the second resolution, and performs, by the artificial intelligence resolution model, super-resolution rendering on the image data of the first image with the second resolution based on the super-resolution multiple. The artificial intelligence super-resolution model may have at least one super-resolution multiple, and each super-resolution multiple may be used to complete conversion between different resolutions. For example, image data with a same resolution is an input. Different super-resolution multiples are used to enable image data output by the artificial intelligence super-resolution model to correspond to different resolutions. In order that a resolution corresponding to the image data output by the artificial intelligence super-resolution model is not less than the first resolution, the first processor may send the first resolution and the second resolution to the third processor. The third processor selects, based on a multiple difference between the first resolution and the second resolution, a super-resolution multiple that is not less than the multiple difference, so that the resolution corresponding to the image data output by the artificial intelligence super-resolution model can be not less than the first resolution.

Optionally, before the third processor performs super-resolution rendering on the image data of the first image with the second resolution by using the artificial intelligence super-resolution model, the method further includes: The first processor initializes the artificial intelligence super-resolution model. Initialization is performed to determine to run the artificial intelligence super-resolution model and determine normal running of the artificial intelligence super-resolution model. Initialization includes a runtime check, model loading, model compilation, and memory configuration, the runtime check is used to determine to run the artificial intelligence super-resolution model, and the model loading, the model compilation, and the memory configuration are used to determine normal running of the artificial intelligence super-resolution model.

Optionally, before the first processor sends a rendering instruction to the second processor, the method further includes: The first processor reduces a resolution of the first image from the first resolution to the second resolution.

Optionally, the electronic device further includes the third processor, the image data of the first image with the third resolution is generated by the third processor, the third processor has a super-resolution multiple, and the super-resolution multiple is used to indicate a difference between the second resolution and the third resolution. The third resolution is the same as the first resolution, and the first processor reduces a resolution of the first image from the first resolution to the second resolution includes: The first processor reduces the resolution of the first image from the first resolution to the second resolution based on the super-resolution multiple. The artificial intelligence super-resolution model may have at least one super-resolution multiple, and each super-resolution multiple may be used to complete conversion between different resolutions. For example, image data with a same resolution is an input. Different super-resolution multiples are used to enable image data output by the artificial intelligence super-resolution model to correspond to different resolutions. Therefore, the first processor may complete reduction of a resolution of the first image based on the super-resolution multiple, so that the reduction of the resolution matches one super-resolution multiple of the artificial intelligence super-resolution model. Subsequently, the resolution can be improved by using the artificial intelligence super-resolution model, to ensure the accuracy.

Optionally, the third processor is a neural-network processing unit or a digital signal processor.

According to a second aspect, this application provides a rendering method. The method is applied to a second processor of an electronic device, the electronic device runs an application, the electronic device further includes a first processor, the application delivers a rendering command to the first processor, the rendering command is used to instruct the second processor to render a first image based on a first resolution, and the method includes: The second processor receives a rendering instruction sent by the first processor. The rendering instruction is used to instruct the second processor to render the first image. The second processor generates image data of the first image with a second resolution based on the rendering instruction. The second resolution is not greater than the first resolution. The second processor writes the image data of the first image with the second resolution into a first memory. The second processor reads image data of the first image with a third resolution from the first memory. The third resolution is greater than the second resolution. The second processor generates the first image based on the image data of the first image with the third resolution. After the second processor writes the generated image data of the first image with the second resolution into the first memory, the second processor may read the image data of the first image with the third resolution from the first memory, to omit a step in which the second processor generates the image data of the first image with the third resolution, reduce computing power of the second processor, and shorten a time period spent in a rendering process, thereby reducing power consumption, improving rendering smoothness, and solving problems that the device generates considerable heat and there is frame freezing during running. In addition, that the third resolution is greater than the second resolution indicates that the second processor may obtain image data with a higher resolution, and the second processor may draw the first image based on the image data with the higher resolution, to improve image quality of the first image.

Optionally, before the second processor writes the image data of the first image with the second resolution into a first memory, the method further includes: The second processor writes the image data of the first image with the third resolution into the second memory. The second processor has the permission to access the second memory and the first memory, and the third processor has the permission to access the first memory. The second processor sends a first notification to the first processor. The first notification is used to indicate that the image data of the first image with the second resolution is successfully written into the second memory. The second processor reads the image data of the first image with the second resolution from the second memory in response to a second notification sent by the first processor. The second notification is sent after the first processor receives the first notification, the second notification is used to indicate the second processor to write the image data of the first image with the second resolution into the first memory, and the second notification carries an address pointer of the first memory. The first processor may monitor an image data reading/writing operation of the second processor, so that after the second processor writes the image data of the first image with the second resolution into the second memory, the second processor is triggered, in a timely manner, to write the image data of the first image with the second resolution into the first memory, to improve efficiency. In addition, the second notification sent by the first processor carries the address pointer of the first memory, and the second processor may write the image data of the first image with the second resolution into the first memory based on the address pointer of the first memory, to improve writing accuracy.

Optionally, after the second processor reads image data of the first image with a third resolution from the first memory, the method further includes: The second processor writes the image data of the first image with the third resolution into the second memory. The second processor has the permission to access the second memory and the first memory, the image data of the first image with the third resolution is generated by the third processor of the electronic device, and the third processor has the permission to access the first memory.

Optionally, before the second processor reads image data of the first image with a third resolution from the first memory, the method further includes: The second processor receives a notification sent by the first processor. The notification is used to indicate the second processor to read the image data of the first image with the third resolution from the first memory, and the notification carries the address pointer of the first memory. The second processor may read the image data of the first image with the third resolution from a correct address based on the address pointer of the first memory, to improve accuracy of the read image data.

According to a third aspect, this application provides an electronic device. The electronic device includes a first processor, a second processor, and a memory, the memory is configured to store one or more pieces of computer program code, the computer program code includes computer instructions, and the first processor and the second processor perform the rendering method when the first processor and the second processor execute the computer instructions.

According to a fourth aspect, this application provides a chip system. The chip system includes program code, and when the program code runs on an electronic device, a first processor and a second processor of the electronic device are enabled to perform the rendering method.

According to a fifth aspect, this application provides a processor. The processor is a second processor, the second processor includes a processing unit and a memory, the memory is configured to store one or more pieces of computer program code, the computer program code includes computer instructions, and the second processor performs the rendering method when the second processor executes the computer instructions.

According to a sixth aspect, this application provides a computer storage medium. The computer storage medium includes computer instructions, and when the computer instructions run on an electronic device, a second processor of the electronic device is enabled to perform the rendering method.

According to a seventh aspect, this application provides a rendering method, applied to rendering processing performed by an electronic device on a first image. The electronic device runs an application, the electronic device includes a first processor, a second processor, and a third processor, and the method includes: The first processor receives a rendering command delivered by the application. The rendering command is used to instruct to render a first image, and the first image has a second resolution. The third processor obtains first image data. The first image data is image data of a first image having a first resolution. The third processor performs super-resolution rendering on the first image data, to obtain second image data. The second image data is image data of a first image having a second resolution, and the first resolution is less than the second resolution. The second processor generates, based on the second image data, the first image having the second resolution.

Optionally, the method further includes: The first processor determines, in response to the rendering command, that a resolution of the first image is the first resolution, and indicates the third processor to obtain the first image data.

Optionally, the method further includes: The first processor determines, in response to the rendering command, that a resolution of the first image is the second resolution. The first processor reduces the resolution of the first image from the second resolution to the first resolution. The first processor indicates the third processor to obtain the first image data.

Optionally, the method further includes: The first processor selects, from a scaling range based on a super-resolution multiple of the third processor, a scaling multiple associated with the super-resolution multiple. The super-resolution multiple is used to indicate a multiple relationship between the first resolution and the second resolution. That the first processor reduces the resolution of the first image from the second resolution to the first resolution includes: The first processor performs reduction processing on the resolution of the first image based on the scaling multiple, so that the resolution of the first image is reduced from the second resolution to the first resolution. A relationship between the scaling multiple and the super-resolution multiple is that a multiplication result of the scaling multiple and the super-resolution multiple is 1.

Optionally, the third processor runs an AI super-resolution model, and that the third processor performs super-resolution rendering on the first image data, to obtain second image data includes: The third processor performs super-resolution rendering on the first image data by using the AI super-resolution model.

Optionally, the method further includes: The first processor initializes the AI super-resolution model. Initialization is performed to determine to run the AI super-resolution model and determine normal running of the AI super-resolution model. Initialization includes a runtime check, model loading, model compilation, and memory configuration, the runtime check is used to determine to run the AI super-resolution model, and the model loading, the model compilation, and the memory configuration are used to determine normal running of the AI super-resolution model.

Optionally, the electronic device invokes one or more framebuffers when performing rendering processing on the first image. The method further includes: When the first processor determines that the resolution of the first image is the second resolution, that a rendering manner of the first image is deferred rendering, and that a currently processed framebuffer is not a last framebuffer, the first processor indicates the third processor to obtain the first image data, to perform rendering processing on the currently processed framebuffer.

Optionally, the method further includes: When the first processor determines that the resolution of the first image is the second resolution, that a rendering manner of the first image is deferred rendering, and that a currently processed framebuffer is a last framebuffer, the first processor indicates the second processor to obtain fourth image data, to perform rendering processing on the currently processed framebuffer. The fourth image data is image data of the first image having the second resolution.

Optionally, the electronic device invokes one or more framebuffers when performing rendering processing on the first image. The method further includes: The first processor determines a main framebuffer in a process of performing rendering processing on the first image. The main framebuffer is a framebuffer on which the electronic device performs a largest quantity of rendering operations in the process in which the electronic device performs rendering processing on the first image. When the first processor determines that the resolution of the first image is the second resolution, that a rendering manner of the first image is forward rendering, and that a currently processed framebuffer is the main framebuffer, the first processor indicates the third processor to obtain the first image data, to perform rendering processing on the currently processed framebuffer.

Optionally, the method further includes: When the first processor determines that the resolution of the first image is the second resolution, that a rendering manner of the first image is forward rendering, and that a currently processed framebuffer is not the main framebuffer, the first processor indicates the second processor to obtain fourth image data, to perform rendering processing on the currently processed framebuffer. The fourth image data is image data of the first image having the second resolution.

Optionally, that the first processor determines a main framebuffer in a process of performing rendering processing on the first image includes: The first processor determines the main framebuffer based on a framebuffer on which a largest quantity of rendering operations are performed in a process of performing rendering processing on a second image. Rendering processing of the second image is performed before rendering processing of the first image.

Optionally, before the determining a main framebuffer in a process of performing rendering processing on the first image, the method further includes: determining, in the process of performing rendering processing on the second image, a quantity of rendering instructions executed on each framebuffer; and determining, as the main framebuffer, the framebuffer on which a largest quantity of drawing instructions are executed.

Optionally, the second image is a previous frame of image of the first image.

Optionally, the first processor is a central processing unit, the second processor is a graphics processing unit, and the third processor is a neural-network processing unit or a digital signal processor.

It should be understood that descriptions of a technical feature, a technical solution, a beneficial effect, or a similar language in this application do not imply that all technical features and advantages can be implemented in any single embodiment. Instead, it can be understood that a statement on a feature or beneficial effect means that at least one embodiment includes a specific technical feature, technical solution, or beneficial effect. Therefore, in this specification, descriptions of a technical feature, a beneficial effect, or a beneficial effect are not necessarily a same embodiment. In addition, technical features, technical solutions, or beneficial effects described in embodiments may be combined in any proper manner. A person skilled in the art may understand that a specific embodiment may be implemented without a need to use one or more specific technical features, technical solutions, or beneficial effects. In other embodiments, additional technical features and beneficial effects may also be identified in a specific embodiment that does not reflect all of the embodiments.

BRIEF DESCRIPTION OF DRAWINGS

FIG. 13A, FIG. 13B, FIG. 13C, and FIG. 13D are another signaling diagram of a rendering method according to this application;

FIG. 15A, FIG. 15B, and FIG. 15C are still another signaling diagram of a rendering method according to this application.

DESCRIPTION OF EMBODIMENTS

In the specification, claims, and accompanying drawings of this application, the terms "first", "second", and "third", and the like are intended to distinguish between different objects but not to limit a particular order.

In embodiments of this application, the word such as "example" or "for example" is used to represent giving an example, an illustration, or a description. Any embodiment or design scheme described as an "example" or "for example" in embodiments of this application should not be explained as being more preferred or having more advantages than another embodiment or design scheme. Specifically, the words such as "example" or "for example" are used to present related concepts in a specific manner.

In a process in which a user uses an electronic device, the electronic device may display each frame of image to the user on a display. A video stream is used as an example. One video stream may include a plurality of frames of images, and the electronic device may sequentially display each frame of image on the display, to display the video stream on the display. An image display may be triggered by an application in the electronic device. The application may send a rendering command for different images to the electronic device, and the electronic device renders the images in response to the rendering command, and performs a display based on a rendering result of the images.

Figure 1:
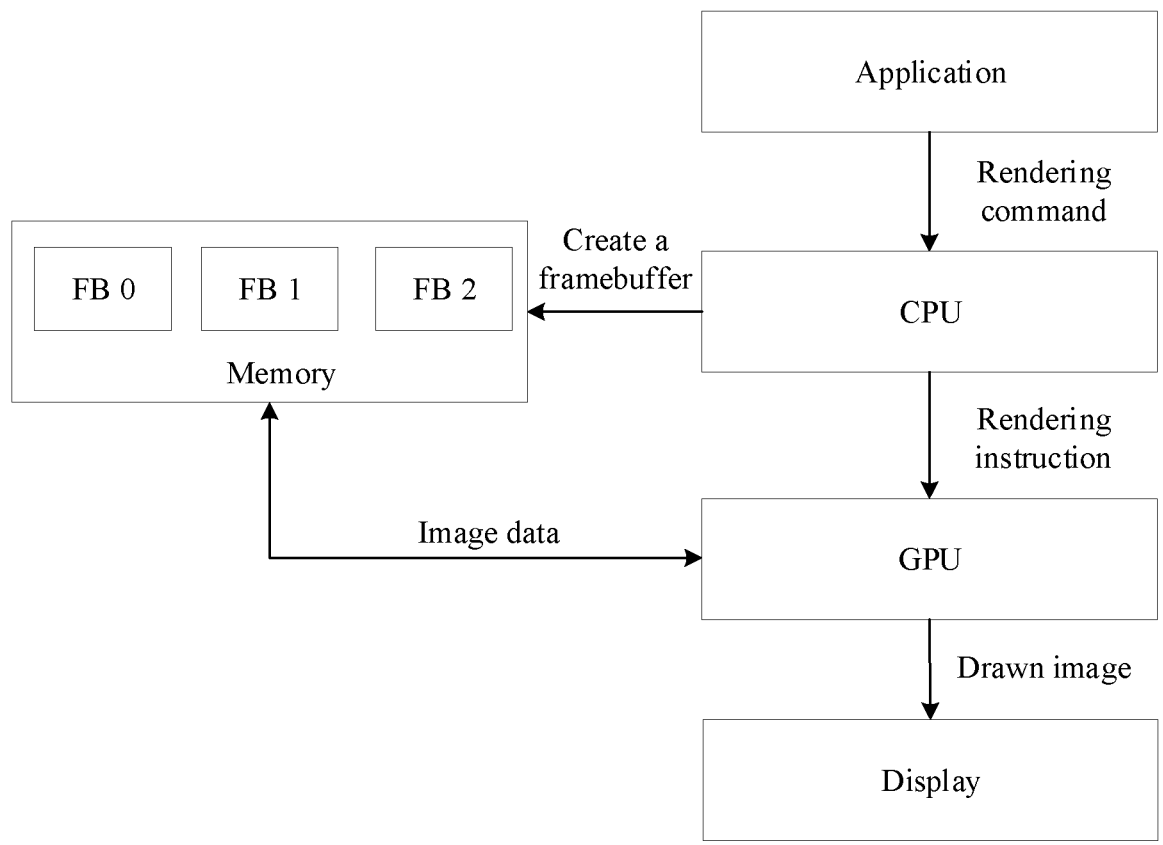
FIG. 1 is a schematic diagram of rendering an image according to this application.

In some implementations, each frame of image corresponds to a plurality of framebuffers (FrameBuffer, FB), and each FB is configured to store a rendering result of some elements of the image, for example, store image data of the some elements. The image data is used to draw a corresponding element. For example, the image includes elements such as a person and a tree. The FB may store image data of the person and image data of the tree, and the electronic device may draw based on the image data stored in the FB. In an embodiment, an optional structure of the electronic device and an FB-based rendering process are shown in FIG. 1. The electronic device may include a central processing unit (Central Processing Unit, CPU), a graphics processing unit (Graphics Processing Unit, GPU), an internal memory, and a display. The internal memory may also be referred to as a memory.

In FIG. 1, after an application (for example, a game application or a video application) installed in the electronic device is started, the application may display an image on the display, the application delivers a rendering command in an image display process, and the CPU may intercept the rendering command delivered by the application. In response to the rendering command, the CPU creates a corresponding FB in the memory for rendering processing of an $i^{th}$ frame of image. For example, in FIG. 1, the CPU may create three FBs for the $i^{th}$ frame of image, and the three FBs are respectively denoted as an FB 0, an FB 1, and an FB 2. The CPU may deliver a rendering instruction to the GPU based on the rendering command, and in response to the rendering instruction, the GPU performs rendering corresponding to the rendering instruction. In an example, the GPU performs rendering processing on the FB 1 and the FB 2 of the $i^{th}$ frame of image in response to the rendering instruction. After rendering processing is completed, the FB 1 and the FB 2 separately store image data of the $i^{th}$ frame of image. For example, the FB 1 may be used to store image data (referred to as image data 1) of some elements of the $i^{th}$ frame of image, and the FB 2 may be used to store image data (referred to as image data 2) of the other elements of the $i^{th}$ frame of image. When the $i^{th}$ frame of image is displayed, the GPU fuses (or renders) the image data 1 and the image data 2 into the FB 0, and the FB 0 stores the complete image data of the $i^{th}$ frame of image. The GPU reads the image data of the $i^{th}$ frame of image from the FB 0, and displays the $i^{th}$ frame of image on the display based on the image data of the $i^{th}$ frame of image.

However, with development of a display technology, a screen refresh rate of the display and a resolution of image develop to a higher stage. For example, the screen refresh rate of the display develops from 60 Hz (Hertz, Hz) to 90 Hz, and then develops from 90 Hz to 120 Hz. The resolution of the image develops from 720P (1280×720) to 1080P (1920×1080), and then develops from 1080P to 2 k (2560×1440), so that rendering of the electronic device develops toward smoother running, a more complex scene, and higher image quality. Therefore, a higher requirement is imposed on computing power of the electronic device. Even if a chip with very strong computing power is used for the electronic device, when the electronic device performs rendering in a rendering manner of the CPU and the GPU, too high computing power overheads may still be occupied, and the rendering manner of the CPU and the GPU cannot meet a rapidly growing computing power requirement. When rendering is performed in the rendering manner of the CPU and the GPU, too much computing power resources are consumed. Consequently, power consumption of the electronic device is improved, considerable heat is generated, and there is even a problem that there is frame freezing during running.

To solve the foregoing problems, this application provides a rendering method. Another processor different from a CPU and a GPU is configured in an electronic device. That the CPU and the GPU control a rendering process is adjusted to a case in which the CPU, the GPU, and the another processor controls the rendering process. For example, computing power of the configured processor may be greater than computing power of the GPU, power consumption may be less than power consumption of the GPU, and a control capability may be weaker than those of the CPU and the GPU. When the CPU, GPU and the another processor control the rendering process, the another processor may generate a high-resolution image and/or an ultra high resolution image, and the computing power of the another processor is actively invoked to complete super-resolution rendering, to meet a computing power requirement of the high-resolution image and/or the ultra high resolution image, reduce power consumption of the electronic device, and reduce occurrence of considerable heat. In addition, the another processor may share a computing amount of the GPU, to shorten a time period spent in the rendering process, thereby improving rendering smoothness, and resolving a problem that there is frame freezing during running. Super-resolution rendering is performed to improve a resolution of image data. The resolution may be improved from a low resolution to a high resolution, or may be improved from a high resolution to an ultra high resolution.

In some implementations, a neural-network processing unit (Neural-network Processing Unit, NPU) is configured in the electronic device. The CPU, the GPU, and the NPU control the rendering process, and the NPU may complete super-resolution rendering, so that the NPU assists in obtaining image data of the high-resolution image or image data of the ultra high resolution image.

In some implementations, a digital signal processor (Digital Signal Processor, DSP) is configured in the electronic device. The CPU, the GPU, and the DSP controls the rendering process, and the DSP may complete super-resolution rendering.

In some implementations, an NPU and a DSP are configured in the electronic device. The CPU, the GPU, the NPU, and the DSP control the rendering process, and the NPU and the DSP may complete super-resolution rendering. Super-resolution rendering of the NPU and the DSP may correspond to different resolutions. In an example, the NPU may correspond to conversion from a low resolution to a high resolution, and the DSP may correspond to improvement from a low resolution to an ultra high resolution. In another example, the NPU may correspond to improvement from a low resolution to an ultra high resolution, and the DSP may correspond to improvement from a low resolution to a high resolution. In still another example, the NPU may correspond to improvement from a low resolution to a high resolution, and the DSP may correspond to improvement from a high resolution to an ultra high resolution.

In some implementations, the NPU and the DSP may cooperate to complete super-resolution rendering. For example, the NPU and the DSP may cooperate to cope with improvement from a low resolution to a high resolution. For another example, the NPU and the DSP may cooperate to cope with improvement from a low resolution to an ultra high resolution. Cooperative coping means that the NPU and the DSP participate in a super-resolution rendering process of a frame of image.

The low resolution may be 540P (960×540) and 720P, the high resolution may be 1080P, and the ultra high resolution may be 2 k or even greater than 2 k. When the electronic device displays an image on the display, the GPU may generate image data of a 540P image and image data of a 720P image, and the NPU may complete improvement from 540P to 1080P, and may complete improvement from 720P to 1080P, to generate image data of a 1080P image by using the NPU. In addition, the NPU may further generate image data of an image with a resolution that is 2 k and even greater than 2 k.

In this embodiment, a use scenario of the rendering method is as follows: Image quality of an output of the electronic device is higher than image quality required by an application. A manner may be as follows: The electronic device may improve a resolution of an image required by the application. When the resolution of the image required by the application is a low resolution, the electronic device may improve the resolution of the application to a high resolution or an ultra high resolution, to automatically improve image quality of the application; or when the resolution of the image required by the application is a high resolution, the electronic device may improve the resolution to an ultra high resolution, to automatically improve image quality of the application.

Figure 2:
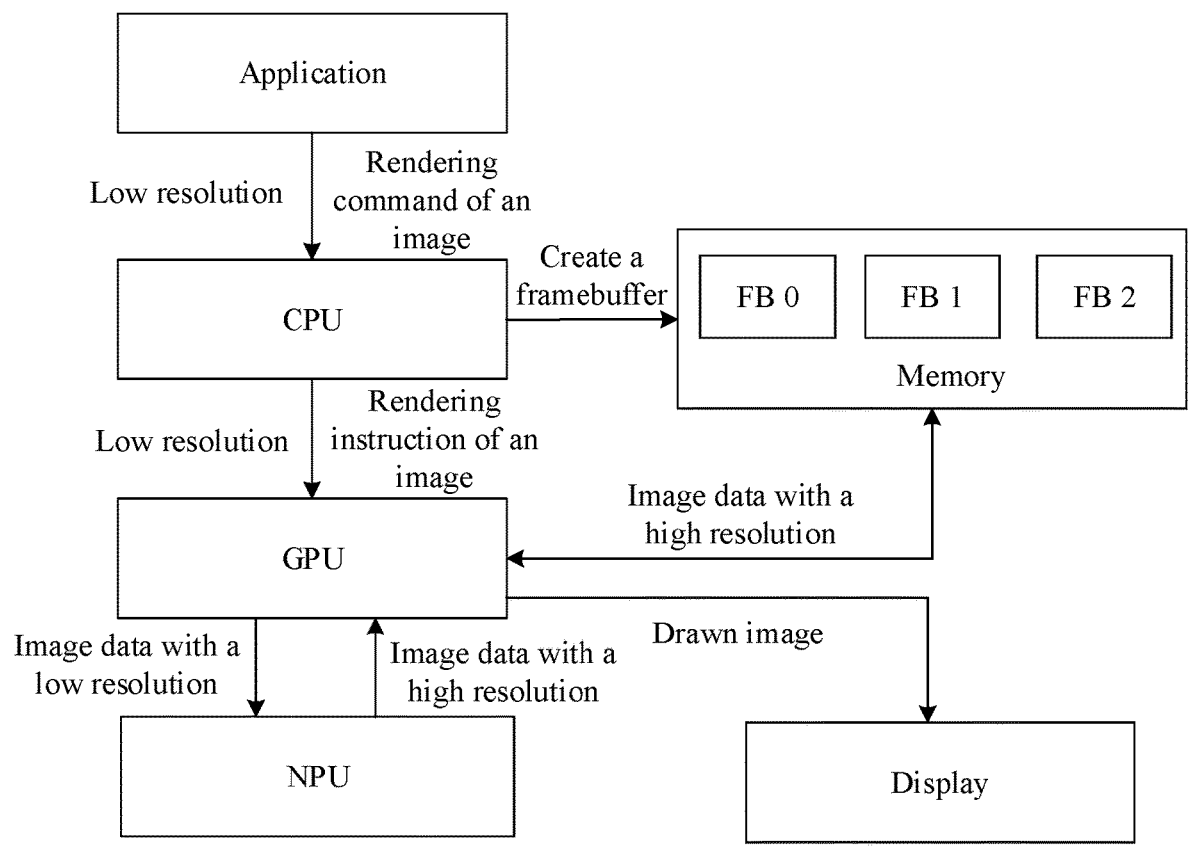
FIG. 2 is another schematic diagram of rendering an image according to this application.

As shown in FIG. 2, the resolution of the image required by the application is a low resolution, and the electronic device may perform the rendering method to improve the low resolution of the image to a high resolution, to automatically change the resolution of the image, and improve the image quality. A processing process of the CPU, the NPU, and the GPU includes: The CPU intercepts a rendering command delivered by the application. In response to the rendering command, the CPU creates a corresponding FB in a memory for image rendering processing. After the CPU learns, based on the rendering command, that the resolution of the image is a low resolution, the CPU sends a rendering instruction to the GPU. The GPU generates image data with the low resolution based on the rendering instruction, and sends the image data with the low resolution to the NPU. The NPU performs super-resolution rendering processing on the image data with the low resolution, to obtain image data with a high resolution, and sends the image data with the high resolution to the GPU. After receiving the image data with the high resolution, the GPU performs user interface (User Interface, UI) rendering and post-processing based on the image data with the high resolution, to complete drawing of one frame of image. For example, the GPU performs, based on the image data with the high resolution, rendering processing on an FB to which the rendering command points, to obtain a rendering result. The rendering result may be image data of some elements of the image. After obtaining rendering results of all FBs, the GPU displays a drawn image on the display based on the rendering results.

Figure 3:
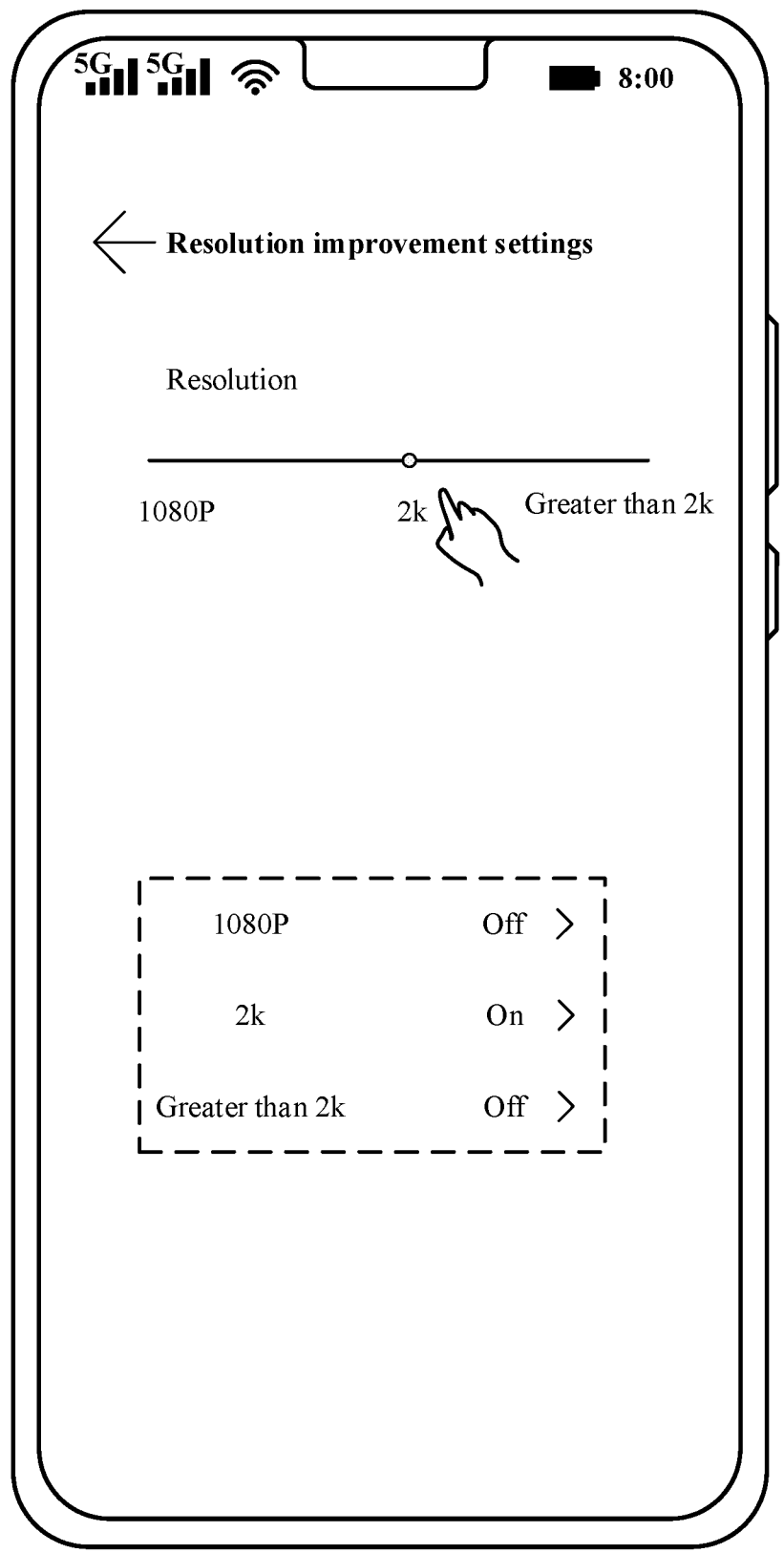
FIG. 3 is a schematic diagram of an interface of Resolution Improvement Settings according to this application.

In this embodiment, the electronic device may provide a setting interface. There is a setting option "Resolution improvement" in the setting interface, and the setting option is used to provide a resolution for selection. FIG. 3 is a schematic diagram of a setting interface. In FIG. 3, the setting option provides a plurality of resolutions for selection, for 1080P, 2 k, and a resolution greater than 2 k. A user may select one resolution from the resolutions. When a resolution of the application is less than a resolution selected by the user, the electronic device performs the rendering method shown in FIG. 2. FIG. 3 is merely an example. The setting option may alternatively be in another form. As shown in a dotted line box in FIG. 3, the setting option is not limited in this embodiment.

In addition, the electronic device may set a whitelist. The whitelist records an application whose resolution needs to be improved. After the CPU intercepts the rendering command delivered by the application, the CPU determines whether the application is in the whitelist. If the application is in the whitelist, the CPU may trigger, by using the GPU, the NPU to improve the resolution, the NPU sends, to the GPU, image data obtained after the resolution is improved, and the GPU performs rendering processing based on the image data obtained after the resolution is improved. If the application is not in the whitelist, the CPU triggers the GPU to perform rendering processing. In this case, a resolution of image data is the same as a resolution delivered by the application.

Figure 4:
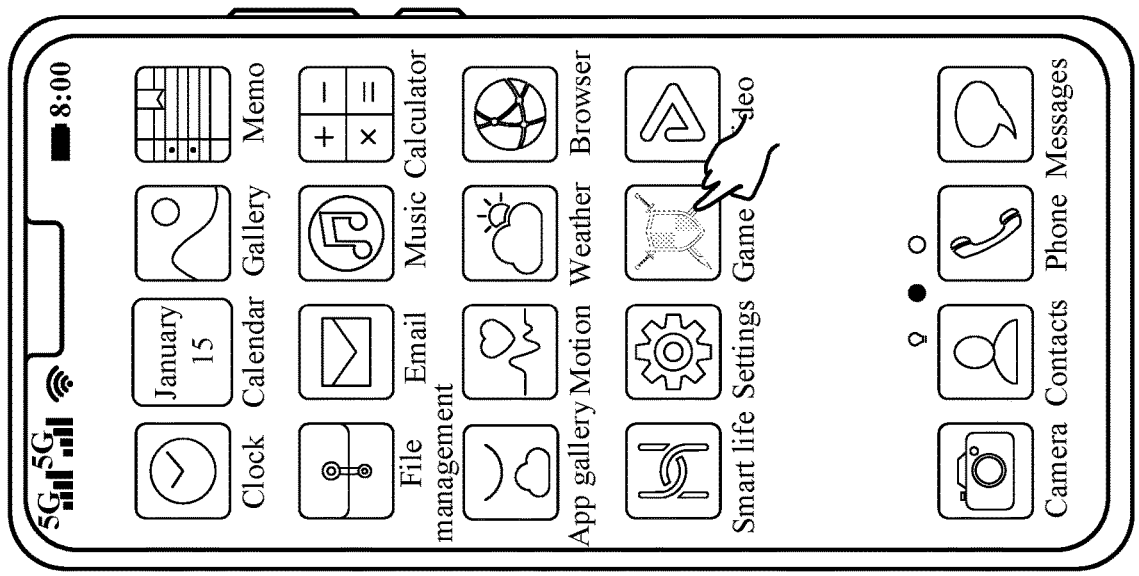
FIG. 4 is still another schematic diagram of rendering an image according to this application.
Figure 4:
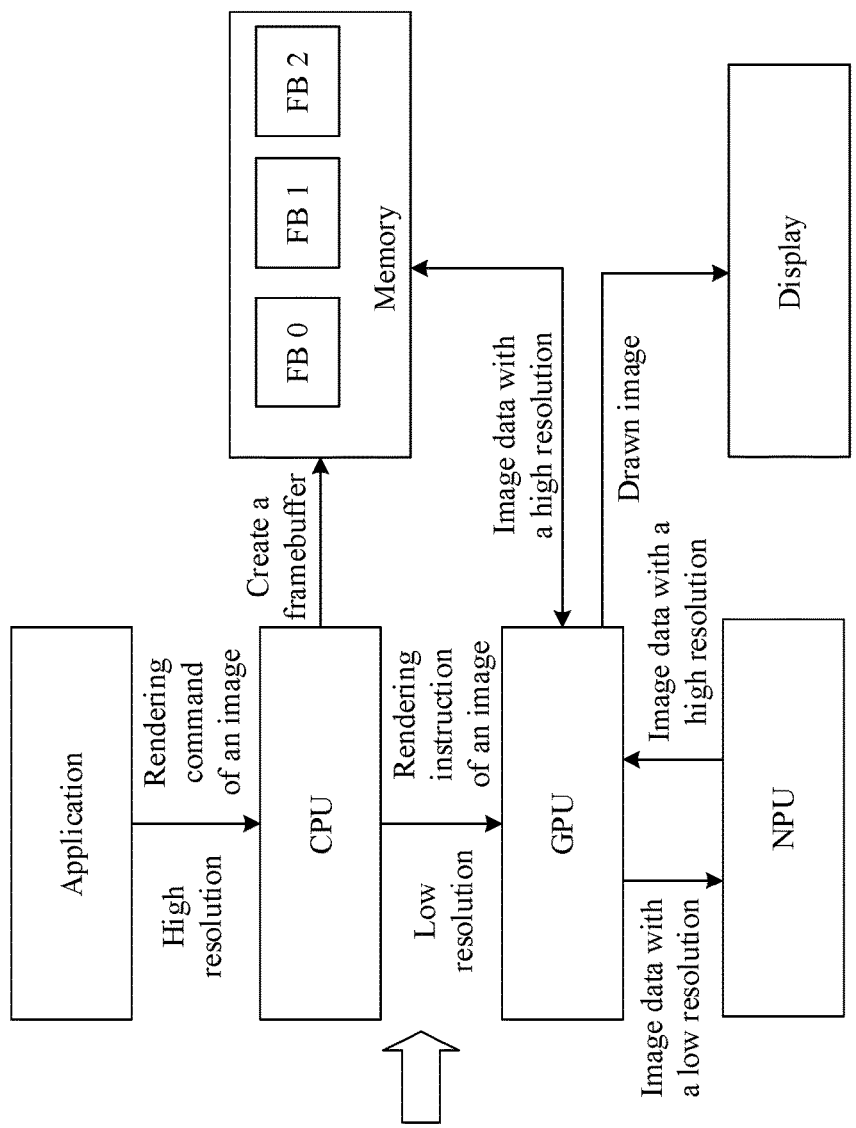

Another use scenario corresponding to the rendering method is as follows: Image quality of an output of the electronic device is the same as image quality required by an application, but the electronic device may first reduce a resolution and then improve the resolution. As shown in FIG. 4, a resolution of an image required by the application may be a high resolution. A processing process of the CPU, the NPU, and the GPU includes: The CPU intercepts a rendering command delivered by the application. In response to the rendering command, the CPU creates a corresponding FB in a memory for image rendering processing. After the CPU learns, from the rendering command through extraction, that the resolution of the image is a high resolution, the CPU reduces the resolution of the image, and then the CPU sends a rendering instruction to the GPU. The GPU generates image data with a low resolution based on the rendering instruction, and sends the image data with the low resolution to the NPU. The NPU performs super-resolution rendering processing on the image data with the low resolution, to obtain image data with a high resolution, and sends the image data with the high resolution to the GPU. After receiving the image data with the high resolution, the GPU performs UI rendering and post-processing based on the image data with the high resolution, to complete drawing of one frame of image. A rendering result of the image is stored in the FB, and the GPU displays a drawn image on the display.

After the CPU reduces the resolution of the image, the NPU may restore the image data with the high resolution through super-resolution rendering processing, and the GPU may restore a high-resolution image based on the image data with the high resolution, so that an image drawn by the GPU and the image required by the application have same image quality, to meet a requirement of the application for the image quality, and improve rendering accuracy. In addition, a data amount inputted into the NPU is reduced after the CPU reduces the resolution of the image, so that the rendering accuracy can be improved, and a rendering speed can be accelerated.

For example, if the resolution of the image is 1080P or more than 1080P, the CPU may reduce the resolution of the image, and then perform, by using the NPU, super-resolution rendering on image data obtained after the resolution is reduced, so that a rendering result obtained after super-resolution rendering corresponds to the resolution existing before reduction. A value by which the resolution is reduced may be determined based on a super-resolution capability of the NPU. For example, if the super-resolution capability is two times of a super-resolution, a resolution of a 1080P image is reduced by 0.5 time. It may be noted that two times and 0.5 time correspond to a side length of the resolution rather than a pixel of the image.

In the rendering method shown in FIG. 4, the CPU may determine, based on the resolution of the image required by the application, whether to reduce the resolution. For example, in this embodiment, if the resolution of the image required by the application is 1080P or more than 1080P, the CPU reduces the resolution of the image, and then the NPU performs super-resolution rendering on the image data with the low resolution; and if the resolution of the image required by the application is less than 1080P, when the resolution of the image remains unchanged, the CPU triggers the GPU to perform rendering processing. For example, in the rendering method shown in FIG. 4, the user taps a game application on a home screen (a game 1 in FIG. 4), a resolution of an image required by the game application is a high resolution, and after the game application is started, the electronic device performs the rendering method shown in FIG. 4.

In addition, when the resolution of the image required by the application is a high resolution, after the NPU receives the image data that has the low resolution and that is sent by the GPU, the NPU performs super-resolution rendering processing on the image data with the low resolution, to obtain image data with an ultra high resolution, and the GPU draws based on the image data with the ultra high resolution. Image quality of the image drawn by the GPU is higher than the image quality of the image required by the application. For example, the resolution of the image required by the application is 1080P, the CPU reduces the resolution to 540P, the GPU generates image data of 540P, the NPU feeds back image data of $2k$ to the GPU, and the GPU may draw an image whose resolution is 2 k. Image quality of the image is higher than image quality of a 1080P image, to improve the image quality of the application.

Figure 5:
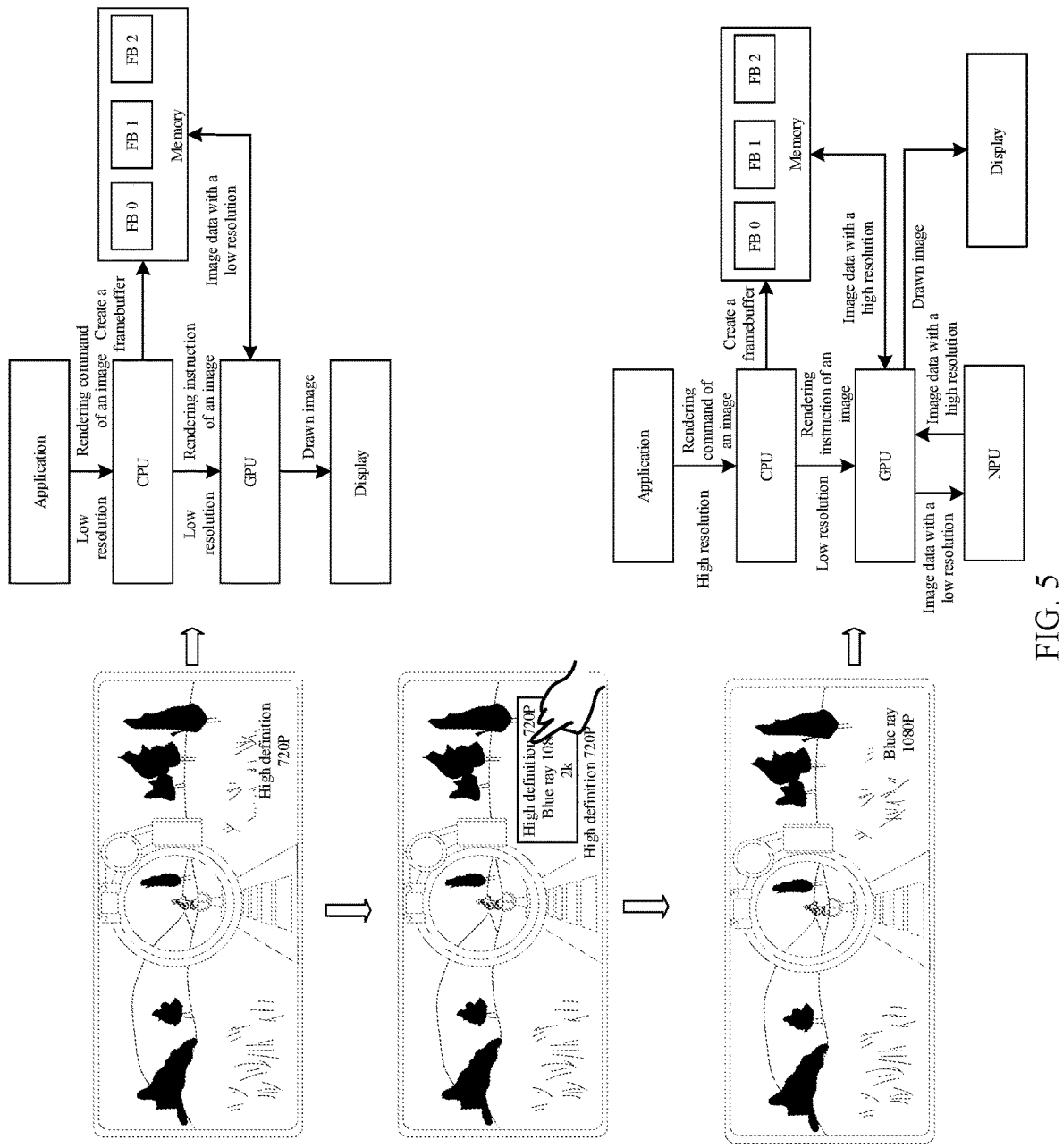
FIG. 5 is yet another schematic diagram of rendering an image according to this application.

Another use scenario corresponding to the rendering method is as follows: A user may adjust image quality of the application in a running process of an application. The user may adjust the image quality from a low resolution to a high resolution or an ultra high resolution, or from a high resolution or an ultra high resolution to a low resolution. FIG. 5 shows that the user adjusts the image quality from the low resolution to the high resolution. A corresponding processing process existing after a resolution is adjusted also changes. The processing process is as follows:

(1) The CPU intercepts a rendering command delivered by the application. In response to the rendering command, the CPU creates a corresponding FB in a memory for image rendering processing.

(2) After the CPU learns, based on the rendering command, that a resolution of an image is a low resolution, the CPU sends a rendering instruction to the GPU. In response to the rendering instruction, the GPU performs rendering processing on an FB, to obtain a rendering result. After the GPU completes rendering processing of all FBs, the GPU displays the image on the display based on the rendering result.

(3) After the user adjusts an image instruction of the application to the high resolution, the CPU may learn, based on the rendering command, that the resolution of the image is the high resolution, the CPU reduces the resolution of the image to the low resolution, and then the CPU may send the rendering instruction to the GPU. The GPU generates image data with the low resolution based on the rendering instruction, and sends the image data with the low resolution to the NPU. The NPU performs super-resolution rendering processing on the image data with the low resolution, to obtain image data with the high resolution, and sends the image data with the high resolution to the GPU. After receiving the image data with the high resolution, the GPU performs UI rendering and post-processing based on the image data with the high resolution, to complete rendering of one frame of image. A rendering result of the image is stored in the FB, and the GPU displays the drawn image on the display.

In this embodiment, the CPU may specify an FB on which super-resolution rendering is to be performed, and when processing the specified FB, the GPU completes super-resolution rendering by using the NPU and/or the DSP, for example, completes conversion from the low resolution to the high resolution and/or the ultra high resolution by using the NPU and/or the DSP, and renders another FB by using the GPU. The GPU may no longer distinguish between resolutions of the image.

The FB on which super-resolution rendering is to be performed may vary with a rendering manner. The rendering manner includes deferred rendering and forward rendering. During deferred rendering, color information (color attachment) is not only used to record color data, but also used to record normal vector data and depth data of each pixel. There is a very large probability that an error occurs when illumination computing is performed on normal vector data on which upsampling is performed, and there is a high correlation between FBs other than an FB 0 in all the FBs (for example, a rendering result of one FB is bound in a next FB). If super-resolution rendering is performed on one FB, there is a very large probability that an error occurs when a rendering result of the FB is used for another FB. Therefore, during deferred rendering, super-resolution rendering may be performed on an FB other than the FB 0 in all FBs corresponding to each frame of image. In other words, during deferred rendering, the FB on which super-resolution rendering is to be performed is an FB other than the FB 0 in all FBs corresponding to one frame of image. For example, all the FBs corresponding to one frame of image include the FB 0, an FB 1, and an FB 2, and the FBs in which super-resolution rendering is to be performed include the FB 1 and the FB 2. The FB 0 is a last FB in all FBs delivered by the application.

During forward rendering, there is a low correlation between FBs, and super-resolution rendering may be performed on at least one FB in all the FBs. During forward rendering, the CPU may determine, based on a quantity of rendering operations, the FB on which super-resolution rendering is to be performed. In an example, the CPU may determine that an FB on which rendering operations whose quantity is greater than a preset quantity are performed is the FB on which super-resolution rendering is to be performed. In another example, the CPU may determine that an FB on which a largest quantity of rendering operations are performed is the FB on which super-resolution rendering is to be performed. The FB on which the largest quantity of rendering operations are performed may be that the GPU performs a largest quantity of drawcalls (a drawing instruction related to drawing) on the FB, because that a larger quantity of drawcalls performed by the GPU on the FB indicates a larger quantity of rendering operations performed by the GPU on the FB. When the GPU renders the FB, more computing power resources are consumed, higher power consumption is generated, and heat is generated. Therefore, in this embodiment, the FB on which the largest quantity of rendering operations are performed may be determined as the FB on which super-resolution rendering is to be performed. The FB on which the largest quantity of rendering operations are performed is the FB on which the largest quantity of drawcalls are performed. For ease of description, the FB on which super-resolution rendering is to be performed during forward rendering is referred to as a main FB, and the FB on which the largest quantity of drawcalls are performed is described below with reference to an example.

In this embodiment, the CPU may be configured to: receive the rendering command from the application, and deliver the corresponding rendering instruction to the GPU based on the rendering command, so that the GPU performs corresponding rendering based on the rendering instruction. In an example, the rendering command may include a function glBindFrameBuffer ( ), and one or more functions glDrawElement, glDrawArray, glDrawElementInstanced, and glDrawArrayInstanced. Correspondingly, the rendering instruction may also include a function glBindFrameBuffer ( ), and one or more functions glDrawElement, glDrawArray, glDrawElementInstanced, and glDrawArrayInstanced. The function glBindFrameBuffer ( ) may be used to indicate a currently bound FB, to bind a corresponding rendering operation and the FB. For example, a function glBindFrameBuffer (1) may indicate that the currently bound framebuffer is the FB 1, and a drawcall 1 executed by the GPU on the FB 1 includes glDrawElement, glDrawArray, glDrawElementInstanced, and glDrawArray Instanced.

Figure 6:
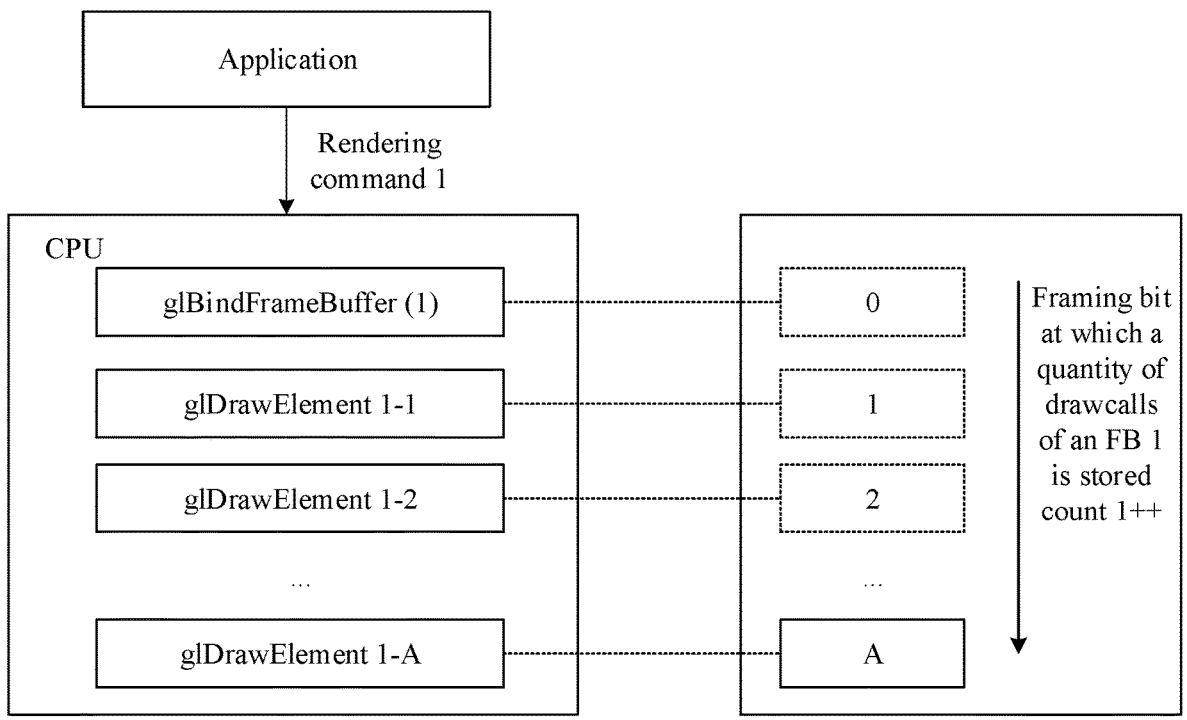
FIG. 6 is a schematic diagram of determining a quantity of drawcalls on different framebuffers according to this application.

For example, for an $N^{th}$ frame of image, the FB 0, the FB 1, and the FB 2 may be used as framebuffers. FIG. 6 shows an example of a rendering command corresponding to the FB 1. The rendering command delivered by the application may include the function glBindFrameBuffer (1), to bind a current rendering operation and the FB 1. After binding the FB 1, an instruction glDrawElement may be used to indicate a rendering operation to be performed on the FB 1. In this example, one instruction glDrawElement may correspond to one drawcall. In different implementations, a plurality of instructions glDrawElement may be executed on the FB 1, and correspondingly, a plurality of drawcalls may be executed on the FB 1.

The CPU may initialize a counter 1 when executing glBindFrameBuffer (1) based on the rendering command delivered by the application. For example, a corresponding count framing bit is configured in the memory for the FB 1, and a value of the framing bit may be initialized to zero by initializing the counter 1. Subsequently, each time glDrawElement is executed on the FB 1, a count of the counter 1 is increased by one. For example, count 1++ is executed. For example, after executing glDrawElement 1-1, the CPU may execute count 1++ on the counter 1, so that a value of a framing bit at which a quantity of drawcalls of the FB 1 is stored changes from zero to one. In this case, one drawcall is executed on the FB 1. By analogy, the CPU may determine that the quantity of drawcalls executed on the FB 1 in the rendering process of the $N^{th}$ frame of image is a current count of the counter 1 (for example, the count may be A).

Figure 7:
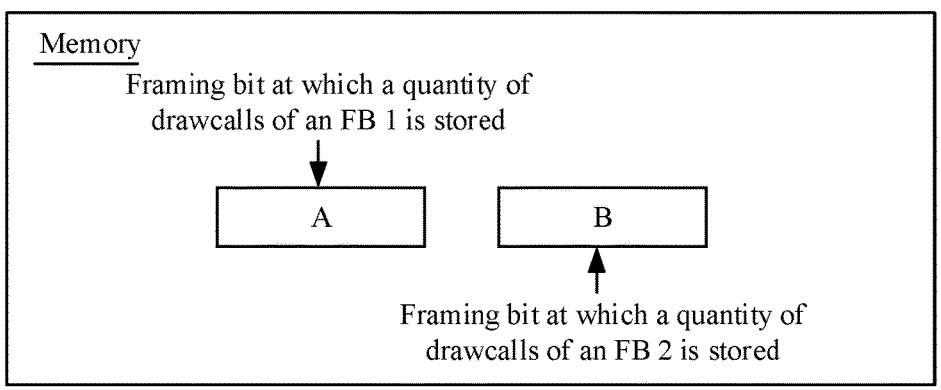
FIG. 7 is another schematic diagram of determining a quantity of drawcalls on different framebuffers according to this application.

Similarly, for the FB 2, the GPU may bind the FB 2 based on a function glBindFrameBuffer (2). Afterwards, the GPU indicates, based on instructions such as glDrawElement, glDrawArray, glDrawElementInstanced, and glDrawArrayInstanced, a rendering operation to be performed on the FB 2. Similar to FB 1, the CPU may also initialize a counter 2 when calling glBindFrameBuffer (2) based on the rendering command delivered by the application. For example, initialization is performed, so that count 2=0. Subsequently, each time glDrawElement is executed on the FB 2, a count of the counter 2 is increased by one. For example, count 2++ is executed. After rendering processing of the image on the FB 2 is completed, the CPU may determine that a quantity of drawcalls executed on the FB 2 in the rendering process of the $N^{th}$ frame of image is a current count of the counter 1 (for example, the count may be B). For example, reference is made to FIG. 7. After rendering processing of the FB 1 and the FB 2 is completed, a value of a framing bit at which a quantity of drawcalls of the FB 1 is stored in the memory may be A, and a framing bit at which a quantity of drawcalls of the FB 2 is stored may be B.

In this example, the CPU may select, as the main FB, an FB corresponding to a larger count of A and B. For example, when A is greater than B, the CPU may determine that the quantity of drawcalls executed on the FB 1 is greater, and determine that the FB 1 is the main FB. On the contrary, when A is less than B, the CPU may determine that the quantity of drawcalls executed on the FB 2 is larger, and determine that the FB 2 is the main FB.

In another example, the CPU may determine that an FB on which drawcalls whose quantity is greater than a preset threshold is the main FB, and the CPU may select, through a count, the FB on which drawcalls whose quantity is greater than the preset threshold. This is not described in detail.

Figure 8:
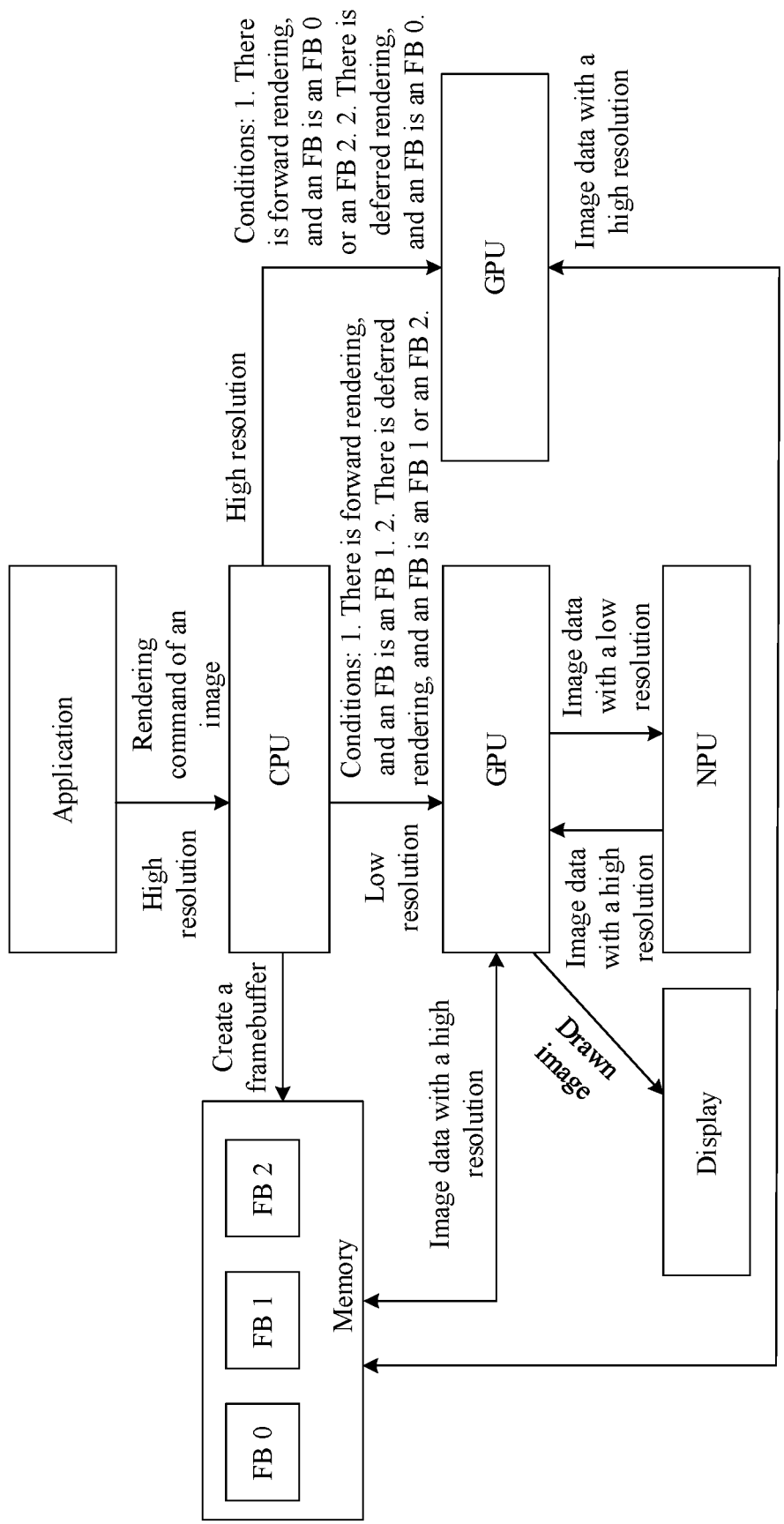
FIG. 8 is still yet another schematic diagram of rendering an image according to this application.

Correspondingly, a process in which the CPU, the GPU, and the NPU perform rendering is shown in FIG. 8. The CPU triggers a rendering procedure based on the rendering command delivered by the application, and the CPU creates an FB. In FIG. 8, the application indicates to render a high-resolution image. After receiving the rendering command, the CPU determines whether the rendering manner is forward rendering or deferred rendering. If the rendering manner is forward rendering, the CPU determines whether an FB on which the rendering operation is currently performed is the FB 1 (the FB 1 is the main FB). If the FB on which the rendering operation is currently performed is the FB 1, the CPU reduces the resolution of the image, and sends the rendering instruction to the GPU, to indicate the GPU to generate the image data with the low resolution. The GPU sends the image data with the low resolution to the NPU, and the NPU completes super-resolution rendering. If the CPU determines that the rendering manner is deferred rendering, the CPU determines whether the FB on which the rendering operation is currently performed is the FB 0. If the FB on which the rendering operation is currently performed is the FB 1 or the FB 2, the CPU may also reduce the resolution of the image, to indicate the GPU to generate the image data with the low resolution. The GPU sends the image data with the low resolution to the NPU, and the NPU completes super-resolution rendering. After receiving the image data that has the high resolution and that is sent by the NPU, the GPU performs UI rendering and post-processing based on the image data with the high resolution, to complete drawing of one frame of image. A rendering result of the image is stored in the FB, and the GPU displays the drawn image on the display.

Two GPUs in FIG. 8 may be a same GPU, and the two GPU are shown to illustrate a case in which different processing manners are used for different FBs in different rendering manners.

In some embodiments, during deferred rendering, when FBs on which a CPU currently performs a rendering operation are an FB 1 and an FB 2, the CPU reduces a resolution of an image, and the GPU may generate image data that has a low resolution and that corresponds to the FB 1, and may further generate image data that has the low resolution and that corresponds to the FB 2. Then, an NPU performs super-resolution rendering on the image data that has the low resolution and that corresponds to the two FBs. In some other embodiments, during deferred rendering, a previous FB of an FB 0 corresponds to image data of one frame of image, the GPU may generate image data that has the low resolution and that is of the previous FB of the FB 0, and the NPU performs super-resolution rendering on the image data that has the low resolution and that corresponds to the previous FB of the FB 0. In other words, during deferred rendering, when an FB is an FB other than the FB 0, the GPU may generate image data with the low resolution, and then the NPU performs super-resolution rendering on a low-resolution image. Alternatively, when an FB is a previous FB of the FB 0, the GPU may generate image data with the low resolution, and the NPU may perform super-resolution rendering on the image data with the low resolution.

The CPU may reduce the resolution of the image based on a super-resolution multiple of the NPU. The super-resolution multiple is used to indicate, to the NPU, a multiple by which the resolution is improved. For example, if the super-resolution multiple of the NPU is two times, the CPU may reduce the resolution of the image by two times; and if the super-resolution multiple of the NPU is four times, the CPU may reduce the resolution of the image by four times. For example, if the super-resolution multiple of NPU is two times, the CPU may reduce the resolution of the image from 1080P to 540P, and the NPU may convert 540P into 1080P, to complete super-resolution rendering from 540P to 1080P. If the super-resolution of the NPU is four times, the CPU may reduce the resolution of the image from 2 k to 540P, and the NPU may convert 540P into 2 k, to complete super-resolution rendering from 540P to 2 k; or the CPU may reduce the resolution of the image from 1080P to 270P, and correspondingly, the NPU may convert 207P into 1080P.

Figure 9:
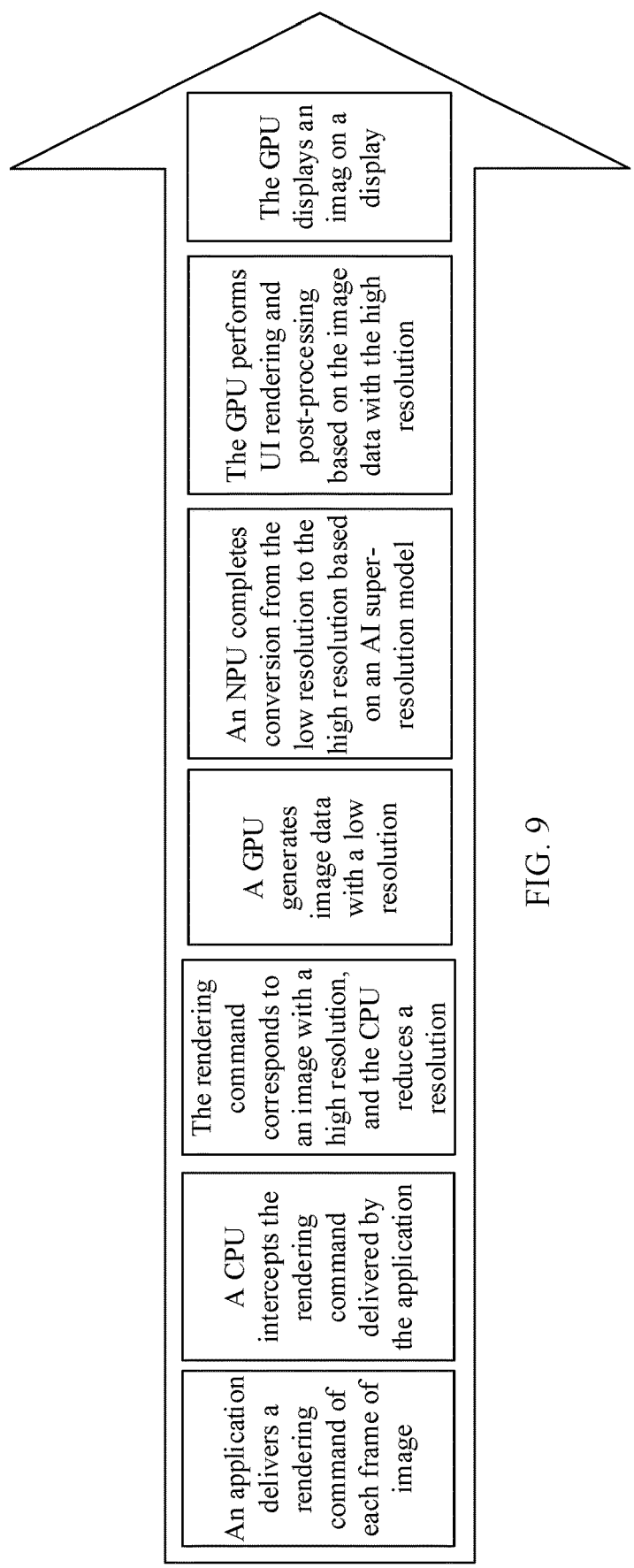
FIG. 9 is a schematic diagram of a rendering method according to this application.

In an embodiment, a schematic diagram corresponding to a rendering method is shown in FIG. 9. An application delivers a rendering command of each frame of image, a CPU intercepts the rendering command delivered by the application, the CPU determines, based on the rendering command, that a resolution of an image corresponding to the current rendering command is a high resolution, and the CPU may reduce the resolution of the image to a low resolution. The CPU sends a rendering instruction to a GPU, and the GPU generates image data with the low resolution based on the rendering instruction. An NPU completes conversion from the low resolution to a high resolution based on an artificial intelligence (Artificial Intelligence, AI) super-resolution model, to obtain image data with the high resolution. The GPU performs UI rendering and post-processing based on the image data with the high resolution, and displays an image on a display.

Figure 10:
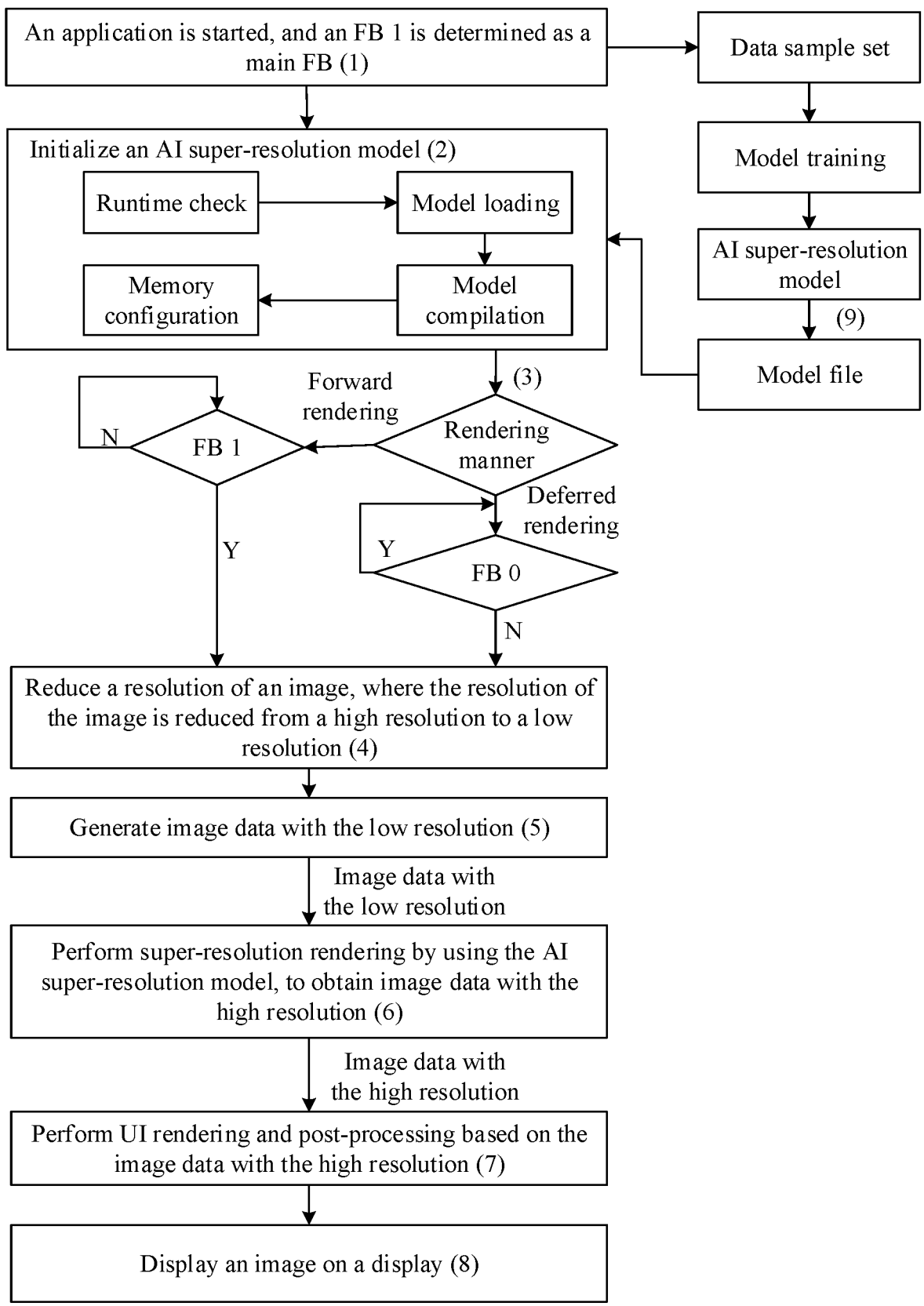
FIG. 10 is a flowchart of a rendering method according to an embodiment of this application.

A flowchart of the rendering method shown in FIG. 9. In the rendering method shown in FIG. 10, the NPU runs the AI super-resolution model, to complete super-resolution rendering by using the AI super-resolution model. The following steps may be included.

(1) After the application is started, an FB 1 is determined as a main FB, and the GPU execute a largest quantity of drawcalls on the FB 1.

(2) The AI super-resolution model is initialized. Initialization includes a runtime check, model loading, model compilation, and memory configuration.

(3) When a rendering manner is forward rendering, (4) is performed when a currently processed FB is the FB 1; and when the rendering manner is deferred rendering, (4) is performed when a currently processed FB is an FB other than an FB 0.

(4) The resolution of the image is reduced. The resolution of the image is reduced from the high resolution to the low resolution.

(5) The image data with the low resolution is generated.

(6) The AI super-resolution model is used to perform super-resolution rendering on the image data with the low resolution, to obtain the image data with the high resolution.

(7) UI rendering and post-processing are performed based on the image data with the high resolution, to complete drawing of one frame of image.

(8) The image is displayed on the display.

(9) In a running process of the application, data collection may be performed to obtain a data sample set, the data sample set is used to perform model training on the AI super-resolution model, to obtain an AI super-resolution model, and then, a conversion tool (Conversion tools) is used to convert the AI super-resolution model into a model file that may be identified by an electronic device.

Figure 11A:
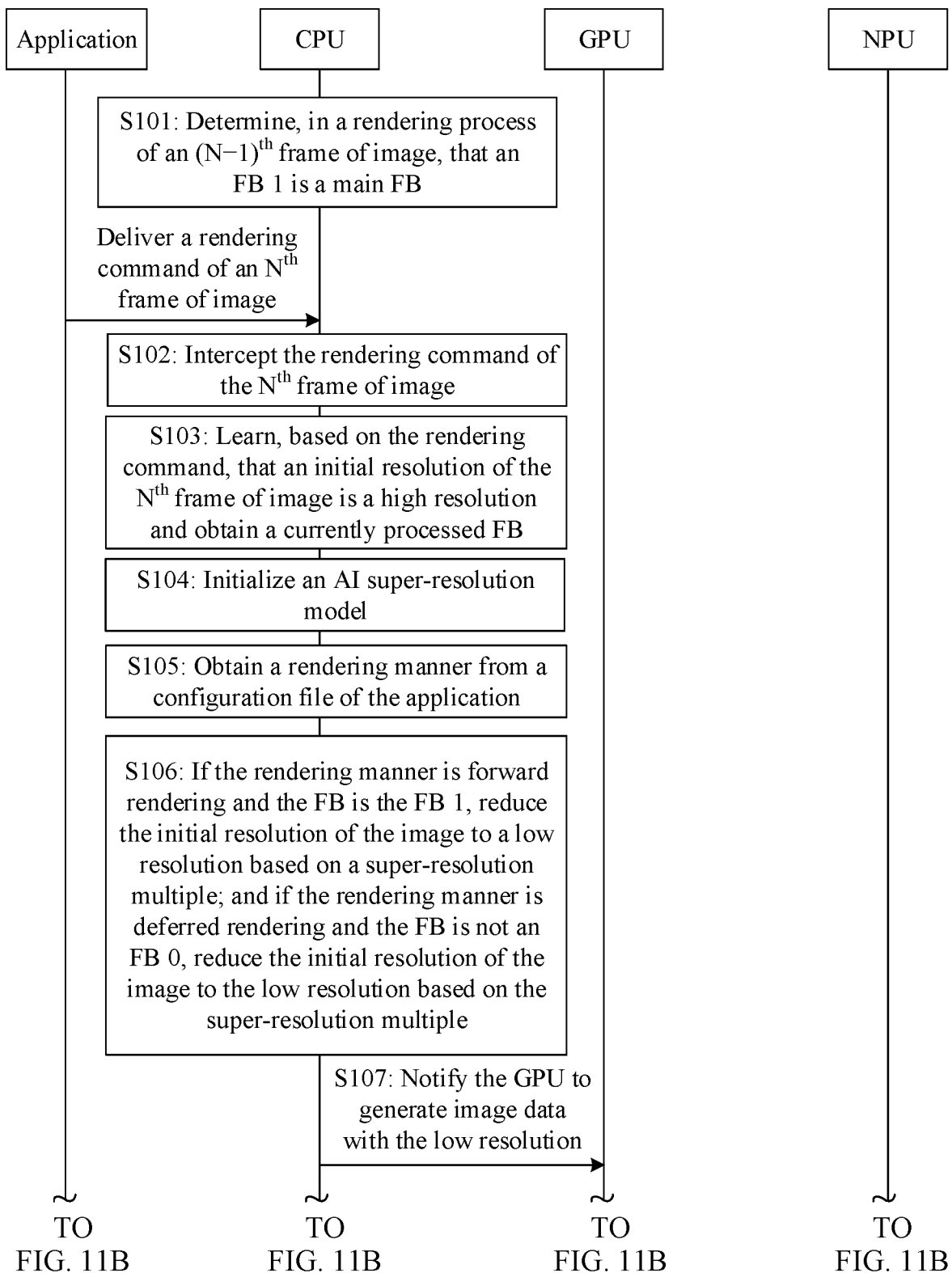
FIG. 11A and FIG. 11B are a signaling diagram of a rendering method according to this application.
Figure 11B:
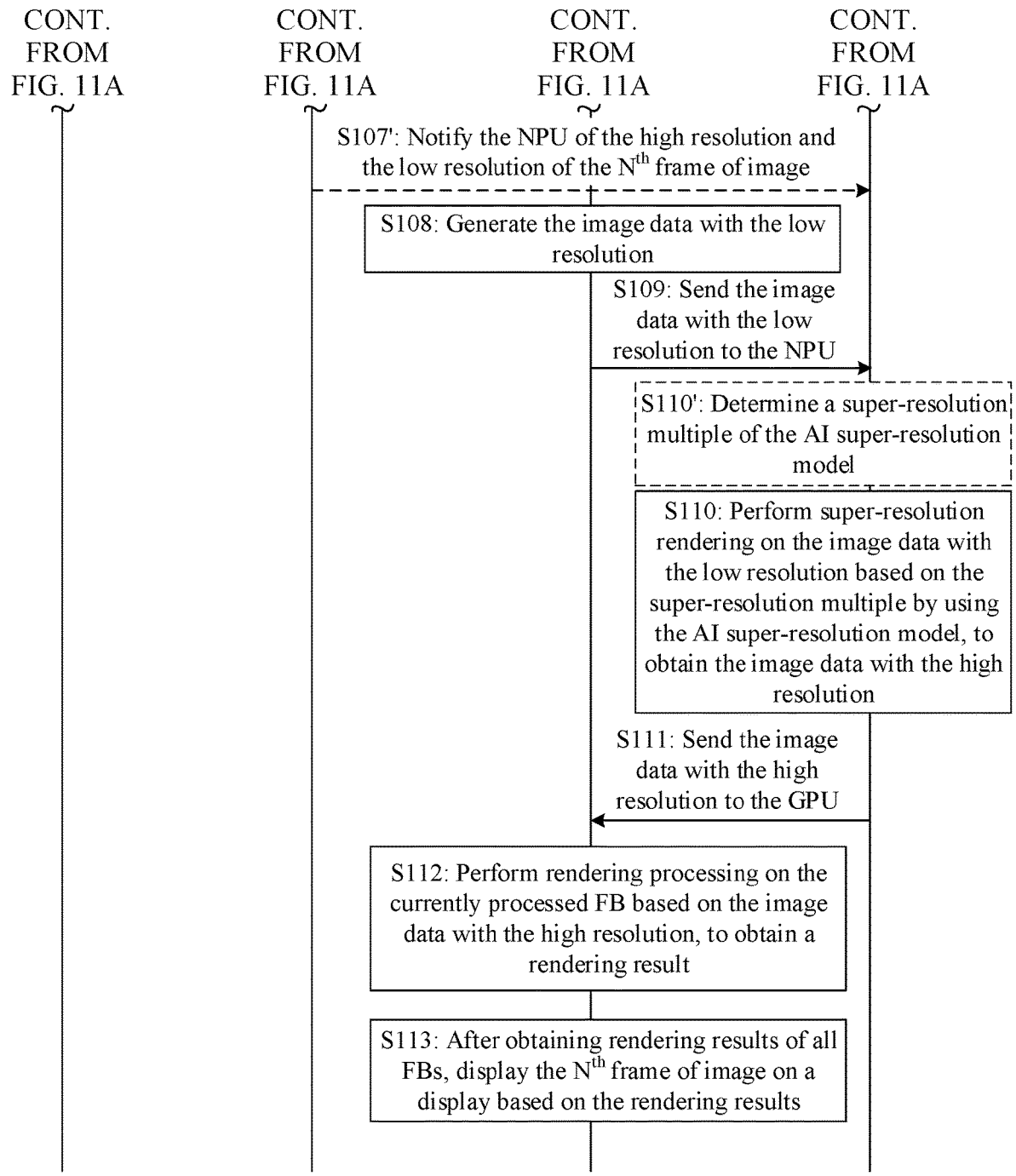

The following describes a detailed process of a rendering method provided in an embodiment by using an example in which an FB 1 is determined as a main FB in a rendering process of an $(N-1)^{th}$ frame of image and by using an example of a rendering process of an $N^{th}$ frame of image after determining the main FB. The process is shown in FIG. 11A and FIG. 11B, and may include the following steps.

S101: A CPU determines, in the rendering process of the $(N-1)^{th}$ frame of image, that the FB 1 is the main FB. The main FB is an FB on which a largest quantity of rendering operations are performed in the rendering process, and the FB on which the largest quantity of rendering operations are performed may be an FB on which a largest quantity of drawcalls are executed. In this embodiment, the CPU determines that the FB 1 is the FB on which the largest quantity of drawcalls are executed.

One frame of image corresponds to a plurality of FBs, and a different quantity of FBs are executed on each FB. In this embodiment, all FBs of one frame of image may be counted, to obtain a quantity of FBs executed on all the FBs of the frame of image. Then, an FB on which a largest quantity of drawcalls are executed in the frame of image is determined as a main FB, and a main FB of another image after the frame of image may be the same as the main FB of the frame of image. For example, a currently rendered frame of image is the $N^{th}$ frame of image. The CPU may determine, based on a quantity of drawcalls performed on different FBs of the $(N-1)^{th}$ frame of image in a rendering process of a previous frame of image (for example, the $(N-1)^{th}$ frame of image), that the FB 1 is the main FB, and determine that the main FB of the $(N-1)^{th}$ frame of image is a main FB of the $N^{th}$ frame of image, an $(N+1)^{th}$ frame of image, an $(N+2)^{th}$ frame of image, or the like.

S102: The CPU intercepts a rendering command delivered by the application for the $N^{th}$ frame of image.

S103: The CPU learns, based on the rendering command, that an initial resolution of the $N^{th}$ frame of image is a high resolution and obtains a currently processed FB.

The CPU may obtain a width and a height of the $N^{th}$ frame of image based on the rendering command, and a width and a height of an image with one resolution are fixed. For example, when the resolution of the image is 720P, the width of the image is 1280, and the height of the image is 720; and when the resolution of the image is 1080P, the width of the image is 1920, and the height of the image is 1080. Therefore, the initial resolution of the $N^{th}$ frame of image can be determined based on the width and the height of the $N^{th}$ frame of image. Usually, an image of 1920×1080 or more is considered to have a high resolution. In this embodiment, when the width and the height of the image satisfy 1920× 1080 or more, an initial resolution of the image may be determined as a high resolution. The CPU may obtain an identifier of the currently processed FB, for example, the FB 1, based on the rendering command. The initial resolution of the $N^{th}$ frame of image and the currently processed FB may be obtained from different rendering commands.

S104: The CPU initializes an AI super-resolution model, determines, based on an initialization operation, whether to run an AI super-resolution model in an NPU, and if the CPU determines to run the AI super-resolution model, ensures that the AI super-resolution model may operate normally.

Initialization of the AI super-resolution model includes a runtime check, model loading, model compilation, and memory configuration, the runtime check is used to determine to run the AI super-resolution model in the NPU, and the model loading, the model compilation, and the memory configuration are used to ensure that the AI super-resolution model may operate normally.

In some implementations, the runtime check includes a check on whether an NPU is configured in an electronic device and a check on a resolution of the application. If an NPU is configured, an AI super-resolution model is run in the NPU; if the resolution of the application is a high resolution or an ultra high resolution, the AI super-resolution model is run; if no NPU is configured in the electronic device or the resolution of the application is a low resolution, running of the AI super-resolution model is forbidden, the CPU delivers a rendering instruction to a GPU, and the GPU performs rendering in response to the rendering instruction.

Model loading is to convert the AI super-resolution model into a model file that may be identified by the NPU, and load the model file into a memory in an initialization phase. Model compilation is to verify that the model file can run successfully. The memory configuration is to allocate a memory to the AI super-resolution model, and the allocated memory is configured to store input data and output data of the AI super-resolution model. In this embodiment, the memory allocated to the AI super-resolution model may be a CPU memory, a memory managed by a neural processing API (for example, SNPE ITensor buffer), or a shared memory.

The CPU memory may be a memory allocated to the CPU, data used in a CPU running process is written into the CPU memory, some space that is of the CPU memory and that is occupied by the AI super-resolution model is used as a memory of the AI super-resolution model, a data exchange between the GPU and the NPU may be performed by using the CPU memory, data in the CPU memory may be written into a GPU memory (a memory allocated to the GPU) when the GPU draw an image, and then, data is read from the GPU memory to draw. The shared memory may be a memory shared by the CPU, the GPU, and the NPU, and the GPU may directly read data from the shared memory to draw.

Herein, it should be noted that when determining that the initial resolution of the $N^{th}$ frame of image is the high resolution, the CPU triggers the AI super-resolution model to be initialized. This is one manner of initializing the AI super-resolution model. The AI super-resolution model may be initialized at another occasion. In an example, the CPU initializes the AI super-resolution model after monitoring that the application is started. Images of some applications are rendered for a small quantity of times, and a small part of the GPU is occupied. The CPU may set an application whitelist. After monitoring that the application is started, the CPU determines whether the application is in the whitelist, and initializes the AI super-resolution model if the application is in the whitelist. In another example, the CPU initializes the AI super-resolution model when a rendering manner is forward rendering and the currently processed FB is the FB 1; and initializes the AI super-resolution model when the rendering manner is deferred rendering and the currently processed FB is not an FB 0.

S105: The CPU obtains the rendering manner from a configuration file of the application.

The rendering manner includes deferred rendering and forward rendering. Super-resolution rendering is performed on different FBs in different rendering manners. During deferred rendering, super-resolution rendering may be performed on an FB other than the FB 0 in all FBs corresponding to each frame of image. In other words, during deferred rendering, super-resolution rendering may be performed on the FB other than the FB 0 in all the FBs corresponding to each frame of image. When determining that an FB on which the rendering command is currently performed is not the FB 0, the CPU performs super-resolution rendering on the FB on which the rendering command is currently performed.

During forward rendering, computing power consumption of the GPU in a rendering process is mainly consumed during rendering of the main FB. During rendering of the main FB, the computing power of the GPU is concentrated in computing of a fragment shader (Fragment Shader, FS). It is inferred, based on this discovery, that super-resolution rendering is performed on the main FB during forward rendering. The main FB may be the FB on which the largest quantity of drawcalls are executed. For example, in this embodiment, if the CPU determines the FB 1 as the main FB in the rendering process of the $(N-1)^{th}$ frame of image, the currently processed FB is the FB 1, and the CPU performs super-resolution rendering on the FB 1.

If the rendering manner is forward rendering and the currently processed FB is not the FB 1, the CPU may send the rendering instruction to the GPU, so that the GPU performs rendering processing on a current FB; and if the rendering manner is deferred rendering and the currently processed FB is the FB 0, the CPU may send the rendering instruction to the GPU, so that the GPU performs rendering processing on the current FB.

S106: If the rendering manner is forward rendering and the currently processed FB is the FB 1, the CPU reduces the initial resolution of the image to a low resolution based on a super-resolution multiple; and if the rendering manner is deferred rendering and an FB is not the FB 0 (for example, the FB 1 and the FB 2), the CPU reduces the initial resolution of the image to the low resolution based on the super-resolution multiple.

The CPU may reduce the resolution of the image by reducing the width and the height of the image. When the CPU reduces the resolution of the image, reference is made to the super-resolution multiple of the AI super-resolution model. The AI super-resolution model may complete conversion of the image data from the low resolution to the high resolution. The high resolution is greater than the low resolution. For example, the high resolution may be one of two, three, and four times of the low resolution, namely, one of two, three, and four times of the super-resolution multiple of the AI super-resolution model. 540P is used as an example. A 1080P image is obtained after two times of super-resolution rendering is performed on a 540P image, and a 2 k image is obtained after four times of super-resolution rendering is performed on the 540P image.

In this embodiment, the CPU may reduce the resolution of the image based on the super-resolution multiple of the AI super-resolution model. The CPU may reduce the resolution of the image based on a scaling multiple. The resolution of the image may be reduced by reducing the width and the height of the image. For example, the image is represented by using the width and the height: Res=w×h, and a value of the scaling multiple r is r∈(0,1). In other words, the value of the scaling multiple r is between zero and one, and an image obtained after the resolution is reduced is $Res_L=(r\times w)\times(r\times h)$. The used scaling multiple is related to the super-resolution multiple of the AI super-resolution model. For example, the initial resolution of the image is 1080P, and is represented as 1920×1080 by using the width and the height. The super-resolution multiple of the AI super-resolution model is two, and the AI super-resolution model can complete conversion from 540P to 1080P. A width and a height of the 540P image are 960×540, and it indicates that the 1080P image is scaled down by two times, and a corresponding scaling multiple is 0.5. If the super-resolution multiple of the AI super-resolution model is four, the AI super-resolution model can complete conversion from 270P to 1080P, to scale down the 1080P image by four times. A corresponding scaling multiple is 0.25. The scaling multiple is to scale up/down a side length of the image. For example, that the scaling multiple is 0.5 means that both the width and the height of the image are scaled down by 0.5 time. When the width and the height of the image are scaled down by 0.5 time, a pixel of the image is scaled down by 0.25.

The super-resolution multiple is used to indicate a super-resolution capability of the NPU, and is used to indicate a multiple by which the NPU improves the resolution. The CPU may determine the super-resolution multiple in an initialization process of the AI super-resolution model. If the CPU does not determine the super-resolution multiple in the initialization process, the CPU may send the high resolution and the low resolution of the image to the NPU, namely, a resolution existing before reduction and a resolution obtain after reduction. The NPU selects a matched super-resolution multiple based on the resolution existing before reduction and the resolution obtain after reduction.

S107: The CPU notifies the GPU to generate image data with the low resolution. In some examples, a super-resolution multiple of the NPU may be a fixed multiple, and a resolution of an image required by each application in the CPU may also be a fixed multiple. For example, if the super-resolution multiple of the NPU is two times, and the resolution of the image required by each application is 1080P, the CPU may reduce the resolution to 540P when reducing the resolution. Because the super-resolution multiple and the resolution of the image are fixed, the GPU learns that the resolution can be reduced to 540P. Therefore, when the CPU notify the GPU to generate the image data with the low resolution, a notification may not carry the low resolution.

In some examples, the super-resolution multiple of the NPU may be a fixed multiple, but the resolution of the image required by each application in the CPU is not fixed. For example, if a resolution of an image required by some applications is 1080P, and a resolution of an image required by some applications is 2 k, different low resolutions may be obtained after the CPU reduces the resolution, and a notification sent by the CPU to the GPU may carry the low resolution.

In some examples, the super-resolution multiple of the NPU may not be fixed. In other words, there are a plurality of super-resolution multiples of the NPU. The CPU may select one of the super-resolution multiples, to reduce the resolution. Correspondingly, the notification sent by the CPU to the GPU may carry the low resolution.

The CPU may also send a notification to the NPU. The notification may carry resolutions of the $N^{th}$ frame of image that exist before and after reduction. For example, there is step S107'. Step S107' is an optional step. For example, step S107' is not performed when the super-resolution multiple of the NPU is not fixed.

S107': The CPU notifies the NPU of a high resolution and a low resolution of the $N^{th}$ frame of image. The NPU may learn of a resolution change situation of the $N^{th}$ frame of image based on the high resolution and the low resolution. When the AI super-resolution model in the NPU is used to perform super-resolution rendering, the AI super-resolution model may determine the super-resolution multiple, to restore image data that conforms to the high resolution of the $N^{th}$ frame of image. Certainly, the NPU may also restore image data with a resolution greater than the high resolution of the $N^{th}$ frame of image.

S108: The GPU generates the image data with the low resolution. For example, the GPU generates RGB image data with the low resolution. The RGB image data includes R-channel data, G-channel data, and B-channel data.

S109: The GPU sends the image data with the low resolution to the NPU.

S110': The NPU determines the super-resolution multiple of the AI super-resolution model.

S110: The NPU performs super-resolution rendering on the image data with the low resolution based on the super-resolution multiple by using the AI super-resolution model, to obtain the image data with the high resolution.

The super-resolution multiple of the AI super-resolution model may be used as the super-resolution multiple of the NPU. In some examples, the super-resolution multiple of the AI super-resolution model is a fixed multiple, and step S110' is omitted. In some examples, the super-resolution multiple of the AI super-resolution model may not be fixed. For example, the super-resolution multiple of the AI super-resolution model includes two times and four times, and the NPU performs step S110', to determine a currently used super-resolution multiple based on the high resolution and the low resolution of the $N^{th}$ frame of image notified in step S107.

In this embodiment, the AI super-resolution model may be obtained by training historical image data with the low resolution by using the image data with the low resolution as an input and by using the image data with the high resolution as an output, and the AI super-resolution model is verified by using, as a reference in a training process, a high-resolution image obtained by the GPU through rendering. The low resolution and the high resolution are relative, and the high resolution and the low resolution may satisfy a relationship that the high resolution is greater than the low resolution. For example, the low resolution is 540P, and the high resolution is 1080P. For another example, the low resolution is 720P, and the high resolution is 2 k.

The AI super-resolution model may be trained offline by using a training framework such as TensorFlow or PyTorch. However, some electronic devices do not support the training framework such as TensorFlow or PyTorch. For example, a model format supported by a mobile phone such as Qualcomm SNPE framework or NNAPI (Android Neural Networks API) is different from TensorFlow, PyTorch, or the like. A model format supported by the Qualcomm SNPE framework is a DLC format, and a model format supported by the NNAPI is TensorFlow Lite. If the AI super-resolution model is trained offline by using the training framework such as TensorFlow or PyTorch, the AI super-resolution model in the format such as TensorFlow and PyTorch may be converted into a format such as TensorFlow Lite, so that the AI super-resolution model is used in a device such as the mobile phone.

After the AI super-resolution model is obtained through training, the AI super-resolution model may be updated to adapt to an image change. For example, the electronic device may obtain a super-resolution rendering effect of the AI super-resolution model, and adjust a parameter of the AI super-resolution model based on the super-resolution rendering effect. The parameter may be adjusted offline or adjusted online. A device party that adjusts the parameter may be the electronic device that performs super-resolution rendering on the AI super-resolution model, or may be another electronic device. After the another electronic device completes adjustment of the parameter, the another electronic device sends the parameter to the electronic device that performs super-resolution rendering on the AI super-resolution model. For example, a computer adjusts the parameter of the AI super-resolution model, and the computer sends the adjusted parameter to the mobile phone for use after completing adjustment. In a rendering process of the application, the electronic device may collect a data sample, to obtain a data sample set. The AI super-resolution model is adjusted by using a data sample in the data sample set.

S111: The NPU sends the image data with the high resolution to the GPU.

S112: The GPU performs rendering processing on the currently processed FB based on the image data with the high resolution, to obtain a rendering result, for example, image data of an element in the $N^{th}$ frame of image.

S113: After obtaining rendering results of all the FBs, the GPU displays the $N^{th}$ frame of image on the display based on the rendering results.

The rendering manner may be used in various scenarios in which the GPU renders an image, for example, may be used in an application such as a game application, a home design application, a modeling application, an augmented reality application, or a virtual display application, to perform super-resolution rendering by using the AI super-resolution model running in the NPU, so as to share a part of a computing amount of the GPU by using computing power of the NPU, so that power consumption of the electronic device is lower and a rendering time period is shorter.

In this embodiment, an image data exchange between the GPU and the NPU may be completed by using the GPU memory and the CPU memory. The GPU memory may be a private memory of the GPU, and the CPU and the NPU are forbidden from accessing the GPU memory. However, the GPU may read the image data from the GPU memory by calling a function, or the like. The image data read by the GPU may be written into the CPU memory, or may be used when the GPU draws an image. Therefore, the GPU memory may be used as an interactive memory and a computational memory of the GPU.

Figure 12:
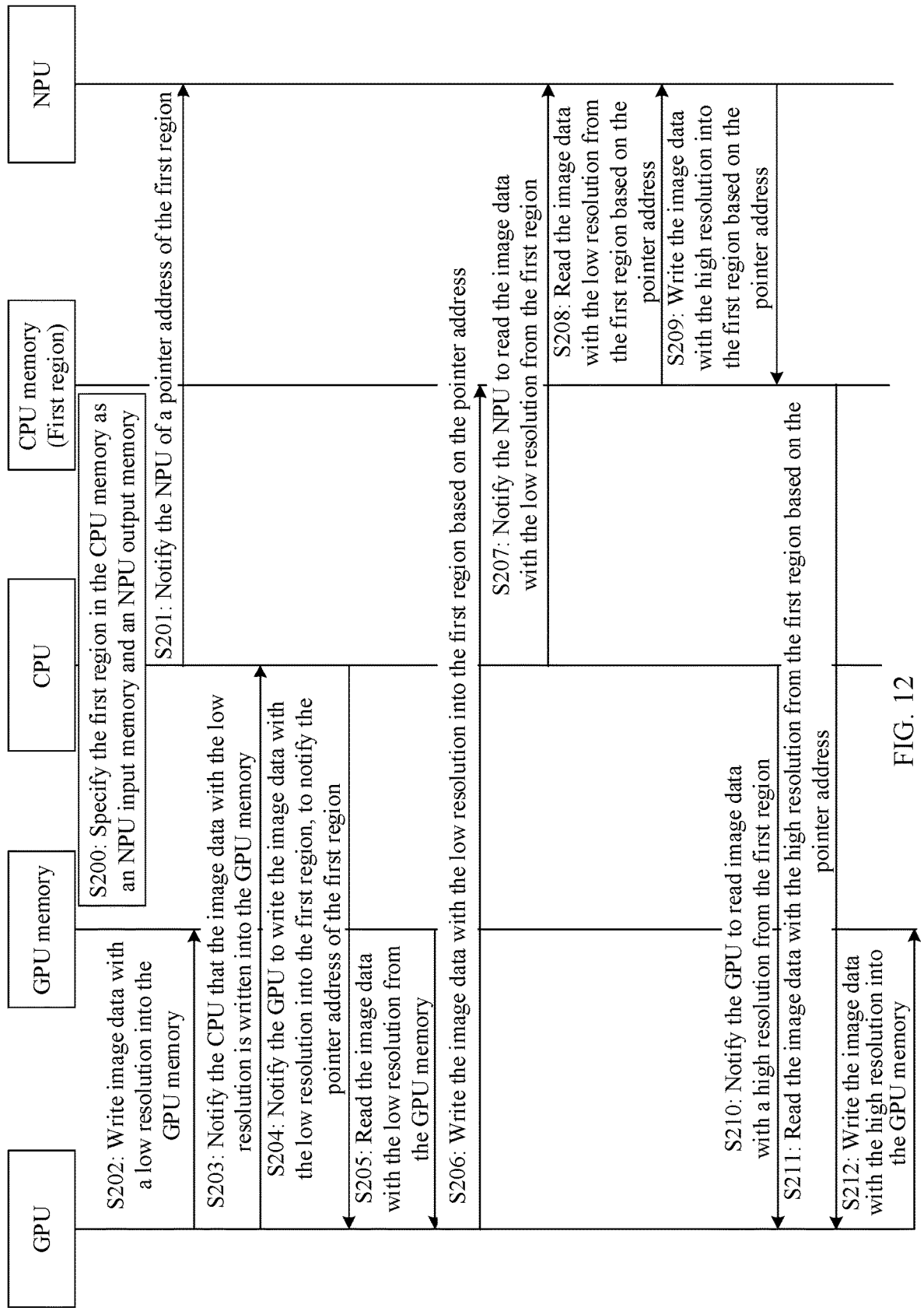
FIG. 12 is a schematic diagram of accessing a memory according to this application.
Figure 13C:
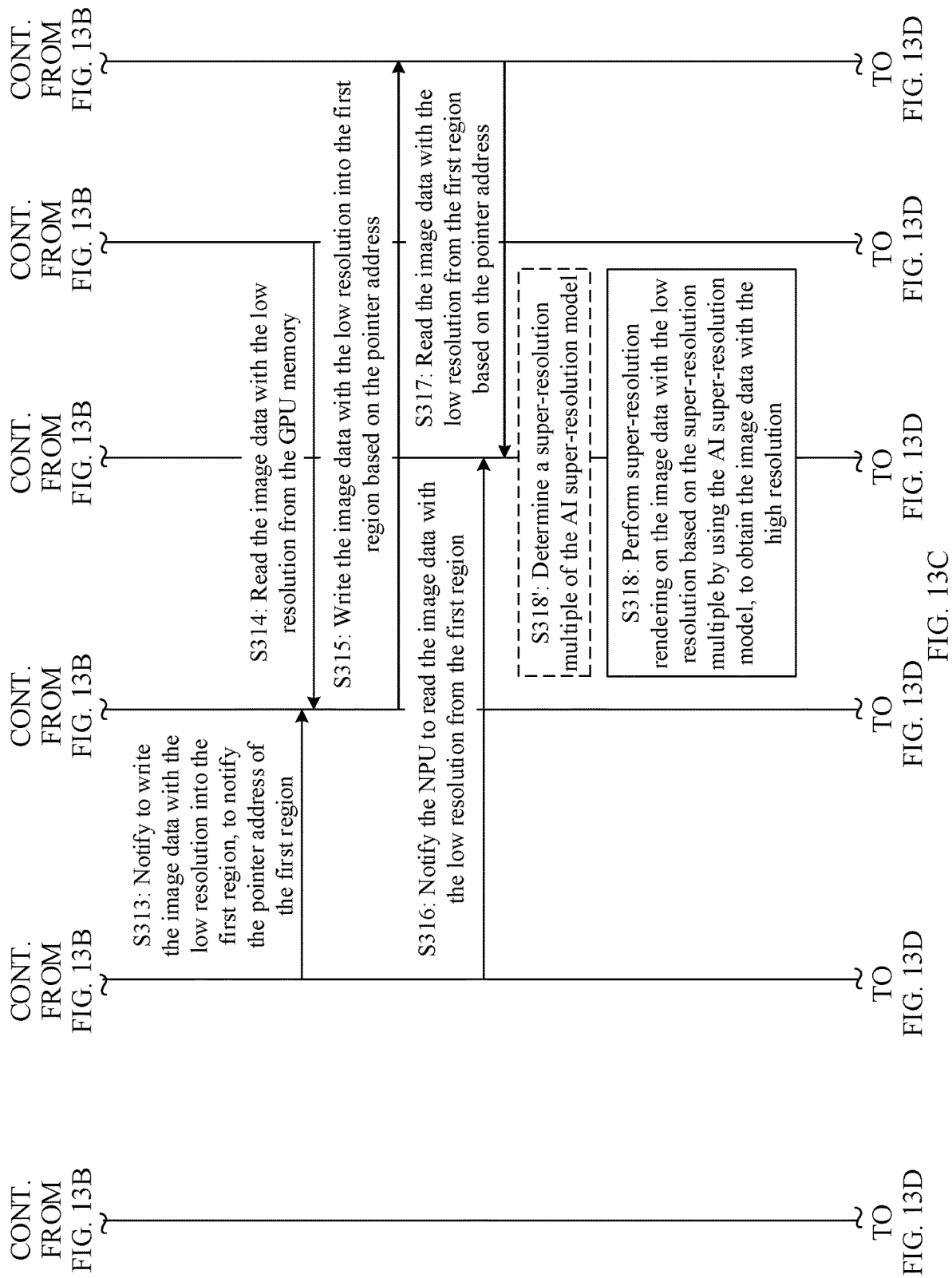
Figure 13D:
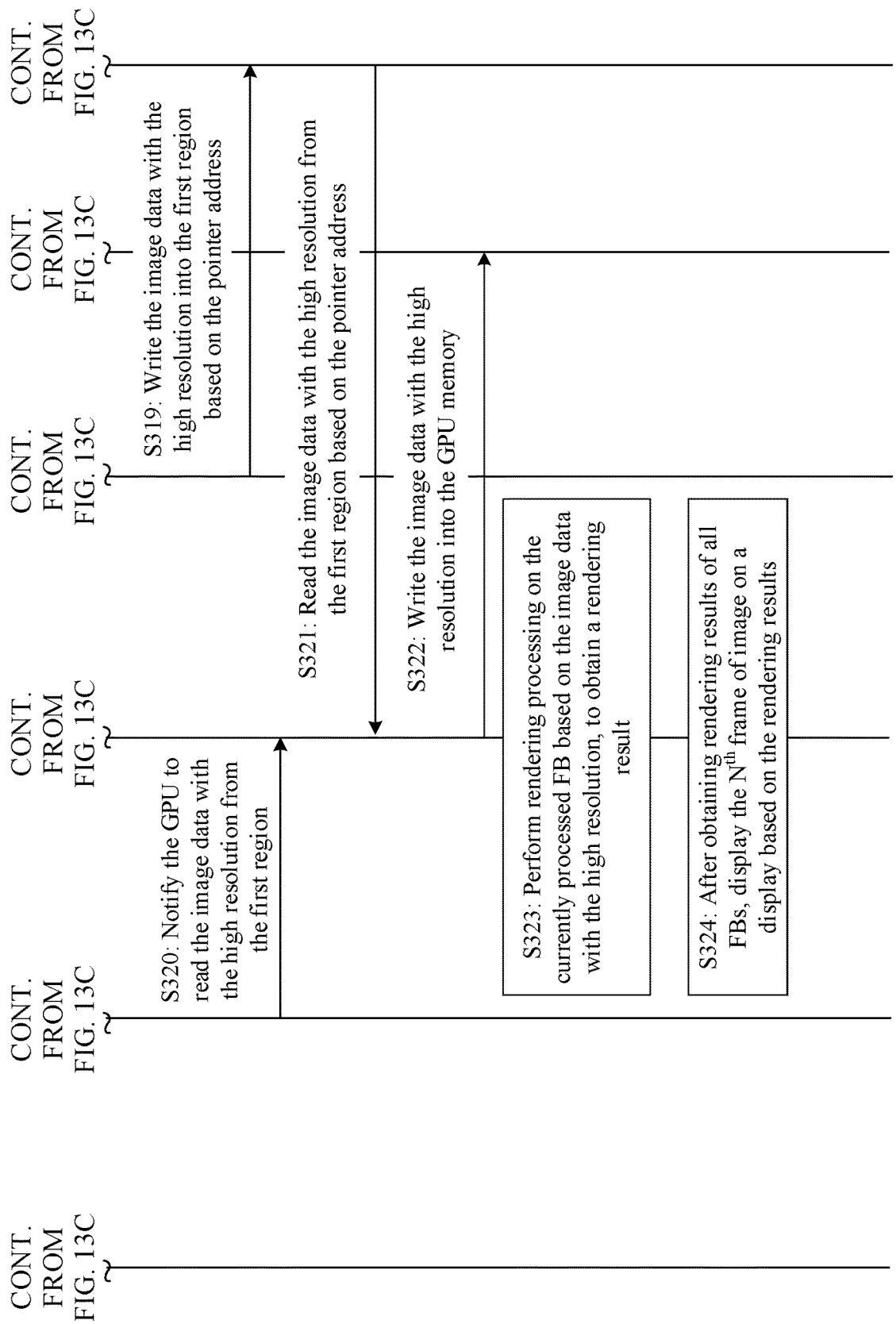

A CPU may specify a block of storage space (for example, a first region) of a CPU memory as an NPU input memory and an NPU output memory. The NPU input memory is input data used when a write NPU performs super-resolution rendering, and the NPU output memory is output data used when the write NPU completes super-resolution rendering. The NPU input memory and the NPU output memory may be a same region in the CPU memory. The CPU may specify space occupied by the NPU in the CPU memory based on a data amount of input data and a data amount of output data of the NPU. Both a GPU and the NPU may access the CPU memory. A corresponding memory access procedure is shown in FIG. 12, and may include the following steps.

- S200: The CPU specifies the first region in the CPU memory as the NPU input memory and the NPU output memory, where the NPU input memory and the NPU output memory may be the first region, the first region is used as the NPU input memory when data is input into the NPU, and is used as the NPU output memory when the NPU outputs data, and a size of the first region may be determined based on a data amount processed by the NPU. Details are not described herein.
- S201: The CPU notifies the NPU of a pointer address of the first region, and the NPU may read image data from the NPU input memory based on the pointer address, and write the image data into the NPU output memory based on the pointer address.
- S202: The GPU writes image data with a low resolution into a GPU memory.
- S203: The GPU notifies the CPU that the image data with the low resolution is written into the GPU memory.
- S204: The CPU notifies the GPU to write the image data with the low resolution into the first region. A notification sent by the CPU carries the pointer address of the first region. The CPU may notify the GPU of the pointer address of the first region in step S201. To be specific, the CPU notifies the NPU and the GPU of the pointer address of the first region.
- S205: The GPU reads the image data with the low resolution from the GPU memory.
- S206: The GPU writes the image data with the low resolution into the first region based on the pointer address.
- S207: The CPU notifies the NPU to read the image data with the low resolution from the first region.
- S208: The NPU reads the image data with the low resolution from the first region based on the pointer address.
- S209: The NPU writes image data with a high resolution into the first region based on the pointer address.

After reading the image data with the low resolution, the NPU inputs the image data with the low resolution to an AI super-resolution model running in the NPU, and the AI super-resolution model performs super-resolution rendering on the image data with the low resolution, and outputs the image data with the high resolution. Then, the NPU writes the image data with the high resolution into the first region based on the pointer address.

- S210: The CPU notifies the GPU to read the image data with the high resolution from the first region.
- S211: The GPU reads the image data with the high resolution from the first region based on the pointer address.
- S212: The GPU writes the image data with the high resolution into the GPU memory.

With reference to the memory access procedure shown in FIG. 12 and the rendering method shown in FIG. 11A and FIG. 11B, FIG. 13A, FIG. 13B, FIG. 13C, and FIG. 13D are a diagram of another time sequence of a rendering method. The following steps may be included.

- S301: A CPU determines, in a rendering process of an $(N-1)^{th}$ frame of image, that an FB 1 is a main FB.
- S302: The CPU intercepts a rendering command delivered by an application for the $N^{th}$ frame of image.
- S303: The CPU learns, based on the rendering command, that an initial resolution of the $N^{th}$ frame of image is a high resolution and obtains a currently processed FB.
- S304: The CPU performs a runtime check, model loading, and model compilation on an AI super-resolution model.
- S305: The CPU specifies a first region in a CPU memory as an NPU input memory and an NPU output memory, completes memory configuration of the AI super-resolution model, and completes initialization of the AI super-resolution model by using step S304 and step S305.
- S306: The CPU notifies an NPU of a pointer address of the first region.
- S307: The CPU obtains a rendering manner from a configuration file of the application.
- S308: If the rendering manner is forward rendering and the currently processed FB is an FB 1, the CPU reduces an initial resolution of the image to a low resolution based on a super-resolution multiple; and if the rendering manner is deferred rendering and an FB is not an FB 0 (for example, the FB 1 and an FB 2), the CPU reduces the initial resolution of the image to the low resolution based on the super-resolution multiple.
- S309: The CPU notifies a GPU to generate image data with the low resolution.
- S309': The CPU notifies the NPU of the high resolution and the low resolution of the $N^{th}$ frame of image.
- S310: The GPU generates the image data with the low resolution.
- S311: The GPU writes the image data with the low resolution into a GPU memory.
- S312: The GPU notifies the CPU that the image data with the low resolution is written into the GPU memory.
- S313: The CPU notifies the GPU to write the image data with the low resolution into the first region. A notification sent by the CPU carries the pointer address of the first region.
- S314: The GPU reads the image data with the low resolution from the GPU memory.
- S315: The GPU writes the image data with the low resolution into the first region based on the pointer address.
- S316: The CPU notifies the NPU to read the image data with the low resolution from the first region.
- S317: The NPU reads the image data with the low resolution from the first region based on the pointer address.
- S318': The NPU determines a super-resolution multiple of the AI super-resolution model.
- S318: The NPU performs super-resolution rendering on the image data with the low resolution based on the super-resolution multiple by using the AI super-resolution model, to obtain image data with the high resolution.

S319: The NPU writes the image data with the high resolution into the first region based on the pointer address.

S320: The CPU notifies the GPU to read the image data with the high resolution from the first region.

S321: The GPU reads the image data with the high resolution from the first region.

S322: The GPU writes the image data with the high resolution into the GPU memory.

S323: The GPU performs rendering processing on the currently processed FB based on the image data with the high resolution, to obtain a rendering result, for example, image data of an element in the $N^{th}$ frame of image.

S324: After obtaining rendering results of all FBs, the GPU displays the $N^{th}$ frame of image on a display based on the rendering results.

If the CPU specifies one region in the CPU memory as the NPU input memory and specifies another region as the NPU output memory, the CPU sends a pointer address of the NPU input memory and a pointer address of the NPU output memory to the NPU, and the NPU reads the image data with the low resolution based on the pointer address of the NPU input memory, and reads the image data with the high resolution based on the pointer address of the NPU output memory. Similarly, the CPU sends the pointer address of the NPU input memory and the pointer address of the NPU output memory to the GPU, and the GPU writes the image data with the low resolution based on the pointer address of the NPU input memory, and reads the image data with the high resolution based on the pointer address of the NPU output memory.

However, for both the image data with the low resolution and the image data with the high resolution, the GPU and the CPU may complete exchange by using the GPU memory and the CPU memory, and there is a problem that the image data is mutually copied in the GPU memory and the CPU memory, to prolong duration in which the GPU and the NPU obtains data, thereby increasing a rendering time period.

In view of this problem, in this embodiment, the GPU, the CPU, and the NPU may exchange data by using a shared memory. The shared memory is a memory that may be accessed by the GPU, the CPU, and the NPU. The shared memory may serve as an external buffer of the GPU, and store at least the image data that has the low resolution and that is entered by the GPU to the NPU. The shared memory may serve as a processing buffer of the NPU, and store at least the image data that has the high resolution and that is output by the NPU.

Figure 14:
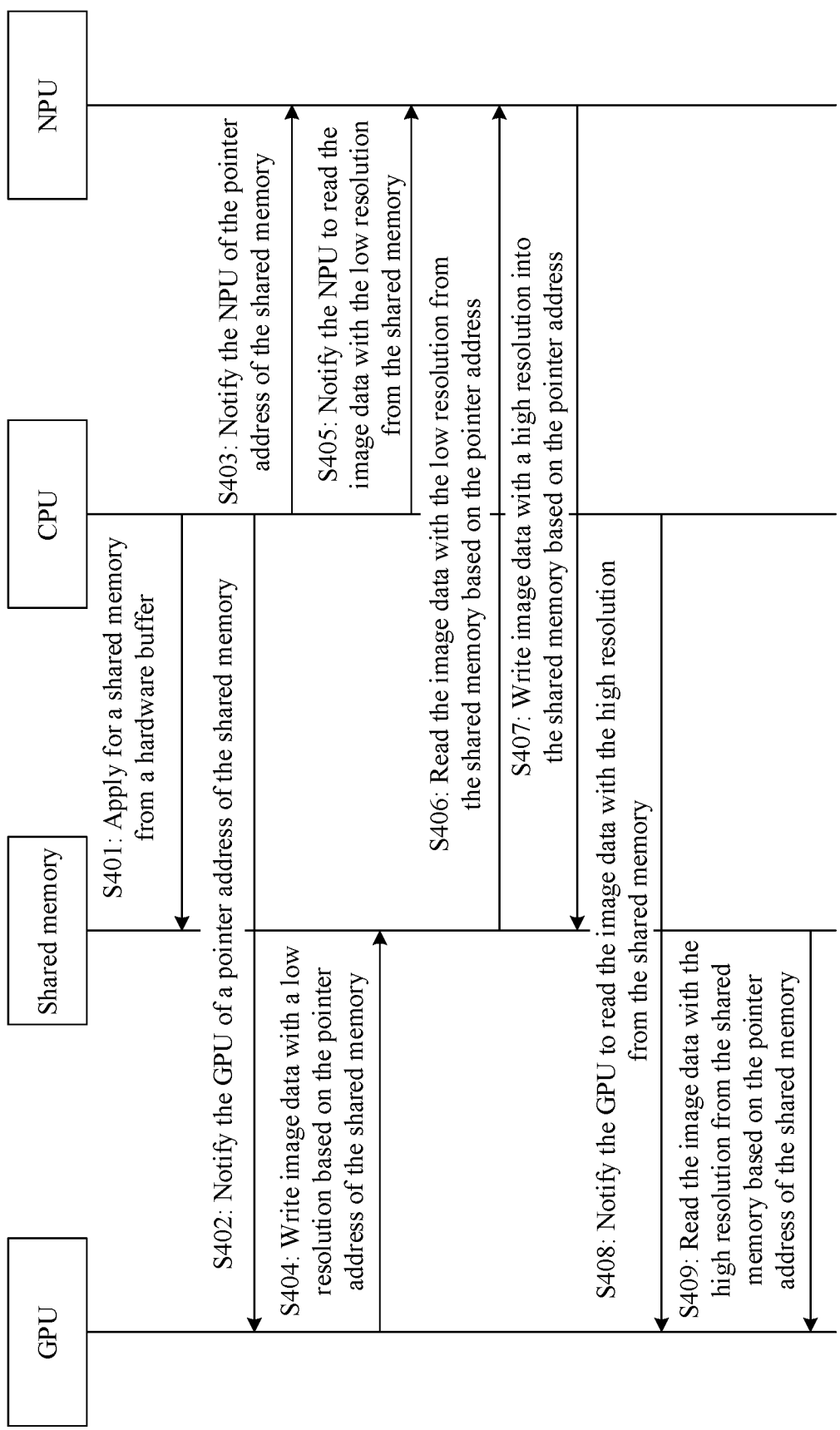
FIG. 14 is another schematic diagram of accessing a memory according to this application.
Figure 15A:
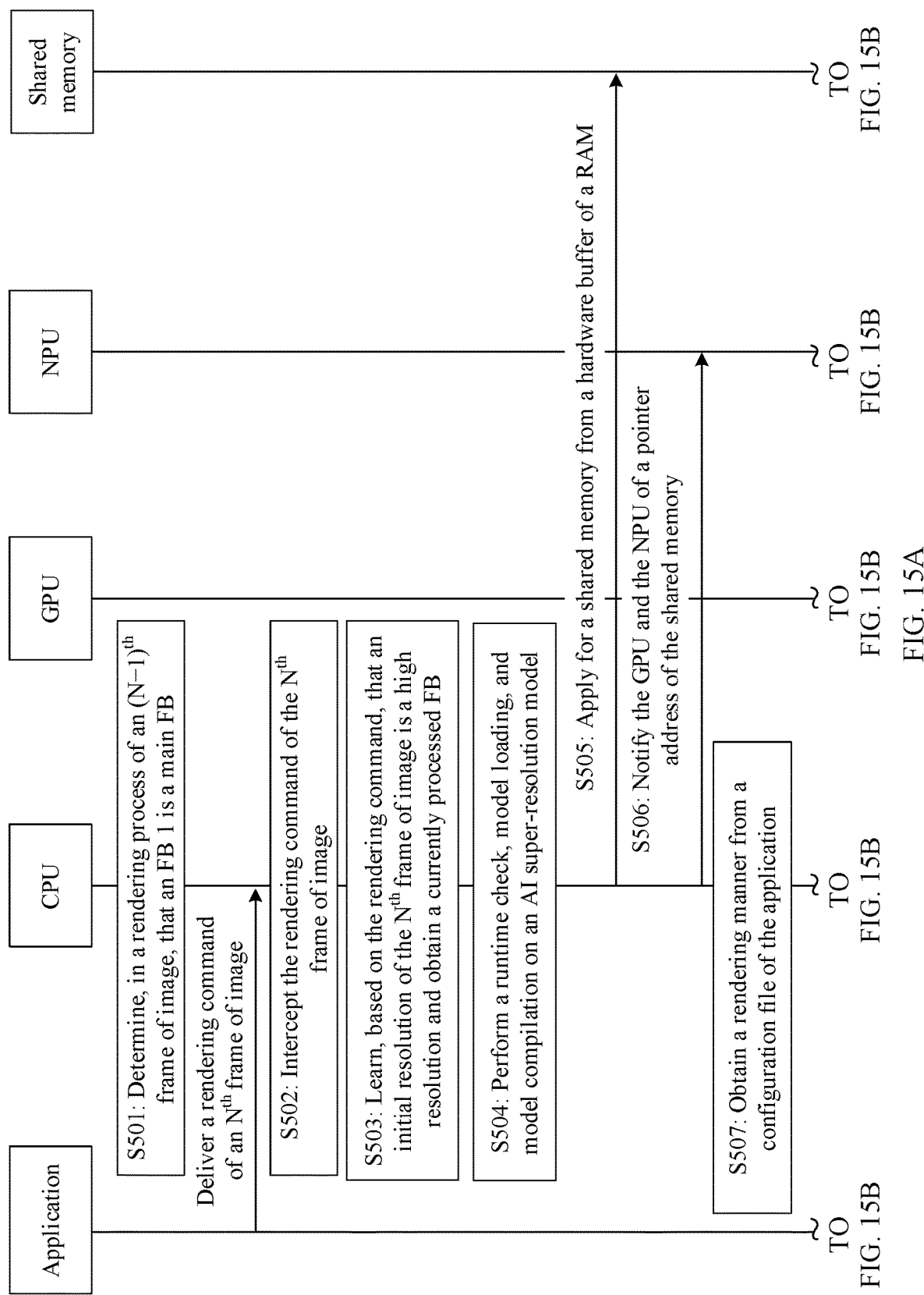
Figure 15B:
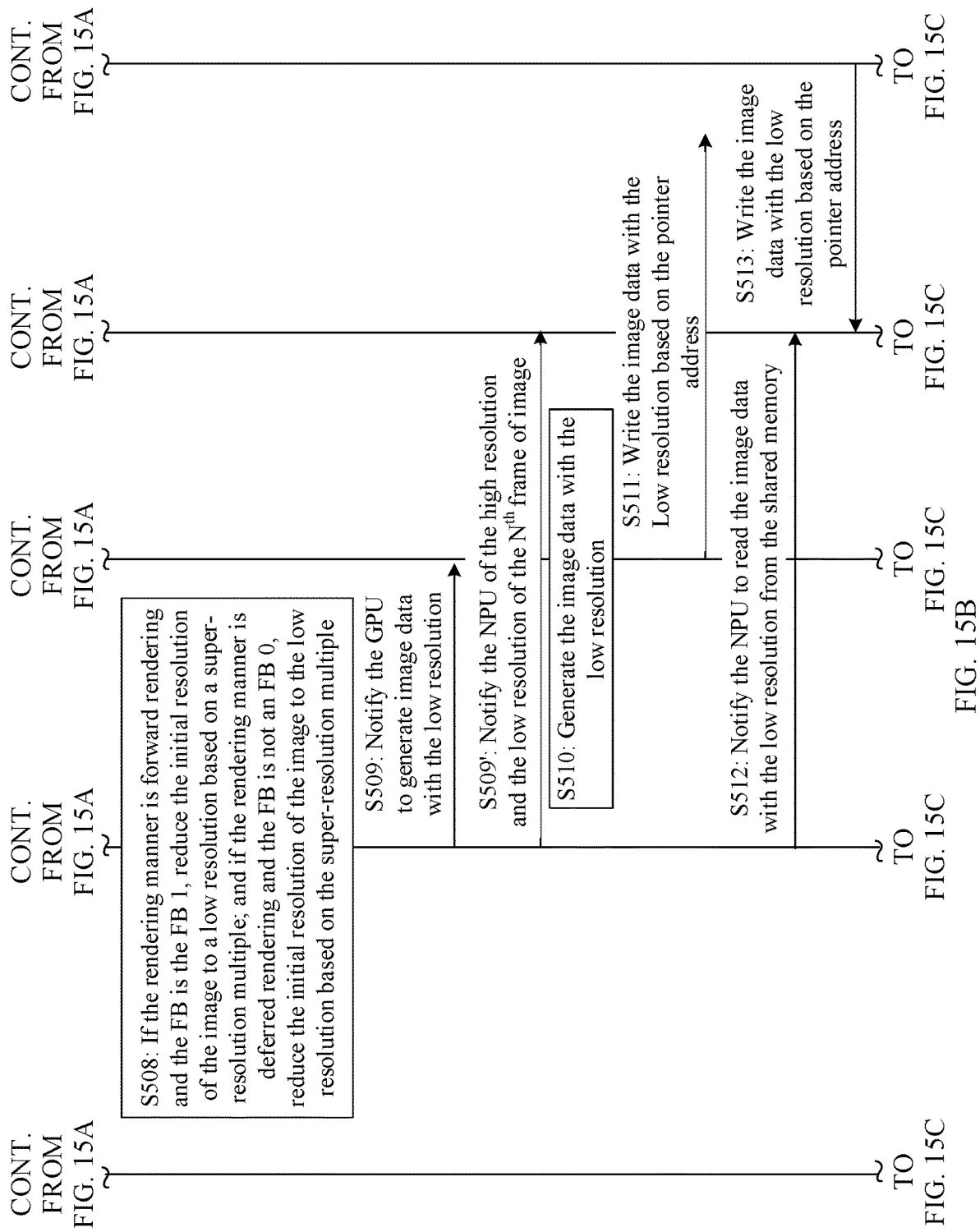

A memory access procedure in which a GPU and an NPU use a shared memory is shown in FIG. 14, and may include the following steps.

S401: A CPU applies for the shared memory from a hardware buffer (Hardware Buffer). The CPU may apply for the shared memory from a hardware buffer of a random access memory (Random Access Memory, RAM). In a manner of applying for the shared memory, the CPU applies for storage space of a GPU SSBO (Shader Storage Buffer Object) from the hardware buffer. After a fragment shader in the GPU or a compute shader in the GPU obtains image data with a low resolution, the image data with the low resolution is written into the GPU SSBO. Image data that has a high resolution and that is output by the NPU may also be written into the shared memory.

The hardware buffer serves as a memory. When the CPU, the GPU, and the NPU access the hardware buffer, there is a specific requirement for a format of the hardware buffer. For example, when the shared memory that is applied for is storage space that may be accessed by the fragment shader in the GPU or the compute shader in the GPU, the format of the hardware buffer may be specified as AHARDWARE-BUFFER_FORMAT_BLOB.

In another manner of applying for the shared memory, the CPU may apply for two shared memories from the hardware buffer. One shared memory is used to store the image data that has the low resolution and that is obtained by the GPU, and the image data is used as input data of the NPU. The other shared memory is used to store output data of the NPU, for example, the image data that has the high resolution and that is obtained through super-resolution rendering, and the image data is used as input data used when the GPU performs UI rendering. The two shared memories applied for by the CPU have a same format. For example, the format of the shared memory may be AHARDWAREBUFFER_FORMAT_BLOB. A size of the shared memory that is applied for may be determined based on a resolution of an image. For example, the size of the shared memory that is applied for is Width×Height×Byte size. For example, a type of the image data is a float type, and a float variable is four bytes. Therefore, the size of the shared memory that is applied for is Width×Height×3×4, and the width and the height are determined based on the resolution of the image. For example, for a 1080P image, the size of the shared memory that is applied for is 1920×1080×3×4.

S402: The CPU notifies the GPU of a pointer address of the shared memory, to use the shared memory as a storage memory of the image data with the low resolution.

S403: The CPU notifies the NPU of the pointer address of the shared memory, to use the shared memory as a storage memory of the image data with the high resolution.

S404: The GPU writes the image data with the low resolution into the shared memory based on the pointer address of the shared memory.

S405: The CPU notifies the NPU to read the image data with the low resolution from the shared memory.

S406: The NPU reads the image data with the low resolution from the shared memory based on the pointer address of the shared memory.

S407: The NPU writes the image data with the high resolution into the shared memory based on the pointer address of the shared memory.

S408: The CPU notifies the GPU to read the image data with the high resolution from the shared memory.

S409: The GPU reads the image data with the high resolution from the shared memory based on the pointer address of the shared memory.

If the CPU applies for two shared memories from the hardware buffer. One shared memory is used to store the image data that has the low resolution and that is obtained by the GPU, and the image data is used as input data of the NPU. The other shared memory is used to store output data of the NPU, for example, the image data that has the high resolution and that is obtained through super-resolution rendering, and the image data is used as input data used when the GPU performs UI rendering. The CPU may send pointer addresses of the two shared memories to the GPU and the NPU, so that the GPU and the NPU can complete reading and writing of image data in the shared memory.

By using the memory access procedure shown in FIG. 14, a GPU and an NPU can share data by using a shared memory, to implement a zero copy of data shared between the GPU and the NPU, thereby improving processing efficiency. With reference to the memory access procedure shown in FIG. 14 and the rendering method shown in FIG. 11A and FIG. 11B, FIG. 15A, FIG. 15B, and FIG. 15C are a diagram of another time sequence of a rendering method. The following steps may be included.

S501: A CPU determines, in a rendering process of an $(N-1)^{th}$ frame of image, that an FB 1 is a main FB.

S502: The CPU intercepts a rendering command delivered by an application for an $N^{th}$ frame of image.

S503: The CPU learns, based on the rendering command, that an initial resolution of the $N^{th}$ frame of image is a high resolution and obtains a currently processed FB.

S504: The CPU performs a runtime check, model loading, and model compilation on an AI super-resolution model.

S505: The CPU applies for the shared memory from a hardware buffer of a RAM, where the shared memory serves as storage space of image data with a low resolution and image data with the high resolution, completes memory configuration of the AI super-resolution model by applying for the shared memory, and completes initialization of the AI super-resolution model by using step S504 and step S505.

S506: The CPU notifies the GPU and NPU of a pointer address of the shared memory.

S507: The CPU obtains a rendering manner from a configuration file of the application.

S508: If the rendering manner is forward rendering and the currently processed FB is the FB 1, the CPU reduces an initial resolution of the image to a low resolution based on a super-resolution multiple; and if the rendering manner is deferred rendering and an FB is not an FB 0 (for example, the FB 1 and an FB 2), the CPU reduces the initial resolution of the image to the low resolution based on the super-resolution multiple.

S509: The CPU notifies the GPU to generate the image data with the low resolution.

S509': The CPU notifies the NPU of the high resolution and a low resolution of the $N^{th}$ frame of image.

S510: The GPU generates the image data with the low resolution.

S511: The GPU writes the image data with the low resolution into the shared memory based on the pointer address of the shared memory.

S512: The CPU notifies the NPU to read the image data with the low resolution from the shared memory.

S513: The NPU reads the image data with the low resolution from the shared memory based on the pointer address of the shared memory.

S514': The NPU determines a super-resolution multiple of the AI super-resolution model.

S514: The NPU performs super-resolution rendering on the image data with the low resolution based on the super-resolution multiple by using the AI super-resolution model, to obtain the image data with the high resolution.

S515: The NPU writes the image data with the high resolution into the shared memory based on the pointer address of the shared memory.

S516: The CPU notifies the GPU to read the image data with the high resolution from the shared memory.

S517: The GPU reads the image data with the high resolution from the shared memory based on the pointer address of the shared memory.

S518: The GPU performs rendering processing on the currently processed FB based on the image data with the high resolution, to obtain a rendering result, for example, image data of an element in the $N^{th}$ frame of image.

S519: After obtaining rendering results of all FBs, the GPU displays the $N^{th}$ frame of image on a display based on the rendering results.

Some embodiments of this application provide an electronic device. The electronic device includes a first processor, a second processor, and a memory. The memory is configured to store one or more pieces of computer program code, the computer program code includes computer instructions, and the first processor and the second processor perform the rendering method when the first processor and the second processor execute the computer instructions.

Some embodiments of this application provide a chip system. The chip system includes program code, and when the program code runs on an electronic device, a first processor and a second processor of the electronic device are enabled to perform the rendering method.

Some embodiments of this application provide a processor. The processor is a second processor. The second processor includes a processing unit and a memory. The memory is configured to store one or more pieces of computer program code, the computer program code includes computer instructions, and the second processor performs the rendering method when the second processor executes the computer instructions.

Some embodiments of this application provide a computer storage medium. The computer storage medium includes computer instructions, and when the computer instructions run on an electronic device, a second processor of the electronic device is enabled to perform the rendering method.

An embodiment further provides a control device. The control device includes one or more processors and a memory. The memory is configured to store one or more pieces of computer program code, the computer program code includes computer instructions, and when the one or more processors execute the computer instructions, the control device performs the method. The control device may be an integrated circuit IC, or may be a system on chip SOC. The integrated circuit may be a universal integrated circuit, or may be a field programmable gate array FPGA, or may be an application-specific integrated circuit ASIC.

A person skilled in the art may clearly learn from the descriptions of the implementations that, for convenient and brief description, division into the foregoing functional modules is merely used as an example for illustration. In an actual application, the foregoing functions may be allocated to different functional modules for completion based on a requirement. In other words, an inner structure of an apparatus is divided into different functional modules, to implement all or some of the functions described above. For a specific working process of the system, apparatus and unit described above, refer to a corresponding process in the foregoing method embodiments. Details are not described herein again.

In the several embodiments provided in embodiments, it should be understood that the disclosed system, apparatus, and method may be implemented in other manners. For example, the described apparatus embodiments are merely an example. For example, division into the modules or units is merely logical functional division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions in embodiments essentially, or the part contributing to the conventional technology, or all or some of the technical solutions may be embodied in a form of a software product. The computer software product is stored in a storage medium and includes several instructions for instructing a computer device (which may be a personal computer, a server, a network device, or the like) or a processor to perform all or some of the steps of the methods described in all embodiments. The foregoing storage medium includes any medium that can store program code, for example, a flash memory, a removable hard disk, a read-only memory, a random access memory, a magnetic disk, or an optical disk.

The foregoing descriptions are merely specific implementations of this application, but are not intended to limit the protection scope of this application. Any variation or replacement made within the technical scope disclosed in this application shall fall within the protection scope of this application. Therefore, the protection scope of this application shall be subject to the protection scope of the claims.

What is claimed is:

1. A rendering method, wherein the method is applied to an electronic device, the electronic device runs an application, the electronic device comprises a first processor and a second processor, and the method comprises:
   receiving, by the first processor, a rendering command delivered by the application, wherein the rendering command is used to instruct the second processor to render a first image based on a first resolution;
   sending, by the first processor, a rendering instruction to the second processor, wherein the rendering instruction is used to instruct the second processor to render the first image;
   generating, by the second processor, image data of the first image with a second resolution based on the rendering instruction, wherein the second resolution is not greater than the first resolution;
   writing, by the second processor, the image data of the first image with the second resolution into a first memory;
   reading, by the second processor, image data of the first image with a third resolution from the first memory, wherein the third resolution is greater than the second resolution; and
   generating, by the second processor, the first image based on the image data of the first image with the third resolution;
   wherein if a rendering manner of the application is forward rendering, the rendering instruction corresponds to a first framebuffer, and a quantity of drawing instructions executed on the first framebuffer is greater than a preset threshold; and
   if the rendering manner of the application is deferred rendering, the rendering instruction corresponds to a framebuffer other than a last framebuffer in all framebuffers delivered by the application.

2. The method according to claim 1, wherein the first framebuffer is a framebuffer on which a largest quantity of drawing instructions are executed in all the framebuffers.

3. The method according to claim 2, wherein before the sending, by the first processor, a rendering instruction to the second processor, the method further comprises:
   obtaining, by the first processor, the rendering manner of the application from a configuration file of the application.

4. The method according to claim 1, wherein the rendering instruction is used to instruct the second processor to render the first image based on the second resolution, and the second resolution is less than the first resolution.

5. The method according to claim 1, wherein the second resolution is less than the first resolution; and
   the third resolution is the same as the first resolution, or the third resolution is greater than the first resolution.

6. The method according to claim 1, wherein the second resolution is equal to the first resolution.

7. The method according to claim 1, wherein the electronic device further comprises a third processor, and the image data of the first image with the third resolution is generated by the third processor.

8. The method according to claim 7, wherein after the writing, by the second processor, the image data of the first image with the second resolution into the first memory, the method further comprises:
   reading, by the third processor, the image data of the first image with the second resolution from the first memory;
   generating, by the third processor, the image data of the first image with the third resolution based on the image data of the first image with the second resolution; and
   writing, by the third processor, the image data of the first image with the third resolution into the first memory.

9. The method according to claim 8, wherein before the writing, by the second processor, the image data of the first image with the second resolution into the first memory, the method further comprises:
   writing, by the second processor, the image data of the first image with the second resolution into a second memory, wherein the second processor has permission to access the second memory and the first memory, and the third processor has permission to access the first memory;
   sending, by the second processor, a first notification to the first processor, wherein the first notification is used to indicate that the image data of the first image with the second resolution is successfully written into the second memory;
   sending, by the first processor, a second notification to the second processor in response to a case in which the first notification is received, wherein the second notification is used to indicate to the second processor to write the image data of the first image with the second resolution into the first memory, and the second notification carries an address of the first memory; and reading, by the second processor, the image data of the first image with the second resolution from the second memory in response to a case in which the second notification is received.

10. The method according to claim 8, wherein after the writing, by the second processor, the image data of the first image with the second resolution into the first memory, and before the reading, by the third processor, the image data of the first image with the second resolution from the first memory, the method further comprises:

sending, by the first processor, a third notification to the third processor, wherein the third notification is used to indicate to the third processor to read the image data of the first image with the second resolution from the first memory.

11. The method according to claim 8, wherein after the writing, by the third processor, the image data of the first image with the third resolution into the first memory, and before the reading, by the second processor, image data of the first image with a third resolution from the first memory, the method further comprises:

sending, by the first processor, a fourth notification to the second processor, wherein the fourth notification is used to indicate to the second processor to read the image data of the first image with the third resolution from the first memory, and the fourth notification carries the address of the first memory.

12. The method according to claim 1, wherein after the reading, by the second processor, image data of the first image with the third resolution from the first memory, the method further comprises:

writing, by the second processor, the image data of the first image with the third resolution into the second memory, wherein the second processor has the permission to access the second memory and the first memory, and the third processor has the permission to access the first memory.

13. The method according to claim 1, wherein the electronic device further comprises a third processor, and the image data of the first image with the third resolution is generated by the third processor; and before the sending, by the first processor, the rendering instruction to the second processor, the method further comprises:

obtaining, by the first processor, the first memory from a third memory through allocation, wherein the first processor has permission to access the third memory; and sending, by the first processor, the pointer address of the first memory to the third processor, and writing, by the third processor, the image data of the first image with the third resolution into the first memory based on the pointer address, and reading the image data of the first image with the second resolution from the first memory based on the pointer address.

14. The method according to claim 1, wherein the electronic device further comprises a third processor, and the image data of the first image with the third resolution is generated by the third processor, and before the sending, by the first processor, the rendering instruction to the second processor, the method further comprises:

obtaining, by the first processor, the first memory from a hardware buffer through allocation;

sending, by the first processor, a pointer address of the first memory to the third processor and the second processor, wherein the first processor, the second processor, and the third processor have permission to access the first memory, and the third processor and the second processor perform image data reading/writing on the first memory based on the pointer address.

15. The method according to claim 14, wherein after the writing, by the second processor, the image data of the first image with the second resolution into the first memory, and before the reading, by the second processor, the image data of the first image with the third resolution from the first memory, the method further comprises:

reading, by the third processor, the image data of the first image with the second resolution from the first memory;

generating, by the third processor, the image data of the first image with the third resolution based on the image data of the first image with the second resolution; and writing, by the third processor, the image data of the first image with the third resolution into the first memory.

16. The method according to claim 15, wherein after the writing, by the second processor, the image data of the first image with the second resolution into the first memory, and before the reading, by the third processor, the image data of the first image with the second resolution from the first memory, the method further comprises:

sending, by the first processor, a fifth notification to the third processor, wherein the fifth notification is used to indicate to the third processor to read the image data of the first image with the second resolution from the first memory.

17. The method according to claim 15, wherein after the writing, by the third processor, the image data of the first image with the third resolution into the first memory, and before the reading, by the second processor, the image data of the first image with the third resolution from the first memory, the method further comprises:

sending, by the first processor, a sixth notification to the second processor, wherein the sixth notification is used to indicate to the second processor to read the image data of the first image with the third resolution from the first memory.

18. An electronic device, wherein the electronic device comprises a first processor, a second processor, and a memory, the memory is configured to store one or more pieces of computer program code, the computer program code comprises computer instructions, and when the first processor and the second processor execute the computer instructions, the first processor and the second processor perform the following operations:

receiving, by the first processor, a rendering command delivered by the application, wherein the rendering command is used to instruct the second processor to render a first image based on a first resolution;

sending, by the first processor, a rendering instruction to the second processor, wherein the rendering instruction is used to instruct the second processor to render the first image;

generating, by the second processor, image data of the first image with a second resolution based on the rendering instruction, wherein the second resolution is not greater than the first resolution;

writing, by the second processor, the image data of the first image with the second resolution into a first memory;

reading, by the second processor, image data of the first image with a third resolution from the first memory, wherein the third resolution is greater than the second resolution; and generating, by the second processor, the first image based on the image data of the first image with the third resolution;

wherein if a rendering manner of the application is forward rendering, the rendering instruction corresponds to a first framebuffer, and a quantity of drawing instructions executed on the first framebuffer is greater than a preset threshold; and if the rendering manner of the application is deferred rendering, the rendering instruction corresponds to a framebuffer other than a last framebuffer in all framebuffers delivered by the application.

19. A non-transitory computer storage medium, wherein the computer storage medium comprises computer instructions, and when the computer instructions run on an electronic device, a second processor of the electronic device is enabled to perform the following operations:

receiving, by the first processor, a rendering command delivered by the application, wherein the rendering command is used to instruct the second processor to render a first image based on a first resolution;

sending, by the first processor, a rendering instruction to the second processor, wherein the rendering instruction is used to instruct the second processor to render the first image;

generating, by the second processor, image data of the first image with a second resolution based on the rendering instruction, wherein the second resolution is not greater than the first resolution;

writing, by the second processor, the image data of the first image with the second resolution into a first memory;

reading, by the second processor, image data of the first image with a third resolution from the first memory, wherein the third resolution is greater than the second resolution; and generating, by the second processor, the first image based on the image data of the first image with the third resolution;

wherein if a rendering manner of the application is forward rendering, the rendering instruction corresponds to a first framebuffer, and a quantity of drawing instructions executed on the first framebuffer is greater than a preset threshold; and if the rendering manner of the application is deferred rendering, the rendering instruction corresponds to a framebuffer other than a last framebuffer in all framebuffers delivered by the application.

* * * * *